US009225481B2

(12) United States Patent
Damnjanovic et al.

(10) Patent No.: US 9,225,481 B2
(45) Date of Patent: Dec. 29, 2015

(54) DOWNLINK GRANTS IN A MULTICARRIER WIRELESS COMMUNICATION SYSTEM

(75) Inventors: Jelena M. Damnjanovic, Del Mar, CA (US); Juan Montojo, San Diego, CA (US); Sandip Sarkar, San Diego, CA (US); Peter Gaal, San Diego, CA (US); Aamod D. Khandekar, San Diego, CA (US); Amir Farajidana, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 776 days.

(21) Appl. No.: 12/537,186

(22) Filed: Aug. 6, 2009

(65) Prior Publication Data

US 2010/0034303 A1    Feb. 11, 2010

Related U.S. Application Data

(60) Provisional application No. 61/087,961, filed on Aug. 11, 2008, provisional application No. 61/113,443, filed on Nov. 11, 2008, provisional application No. 61/143,146, filed on Jan. 7, 2009, provisional application No. 61/112,029, filed on Nov. 6, 2008.

(51) Int. Cl.
*H04W 4/00* (2009.01)
*H04L 5/00* (2006.01)
*H04W 72/04* (2009.01)

(52) U.S. Cl.
CPC .............. *H04L 5/003* (2013.01); *H04L 5/0091* (2013.01); *H04W 72/042* (2013.01)

(58) Field of Classification Search
CPC ..... H04L 5/003; H04L 5/0091; H04W 72/04; H04W 72/042

USPC ........................... 370/329; 455/450-464, 509
See application file for complete search history.

(56) References Cited

U.S. PATENT DOCUMENTS 5,159,518 A    10/1992  Roy
5,629,544 A    5/1997   Voldman et al.
6,589,823 B1   7/2003   Beebe et al.
(Continued)

FOREIGN PATENT DOCUMENTS

FR    2903833 A1    1/2008
RU    2287228 C2    11/2006
(Continued)

OTHER PUBLICATIONS

Ericsson et al: "Text Proposal for DC-HSDPA assumptions and standards impact" 3GPP Draft; R1-082249 Text Proposal for DC-HSDPA Assumptions and Standards Impact, 3rd Generation Partnership Project (3GPP), Mobile Competence Centre; 650, Route Des Lucioles; F-06921 Sophia-Antipolis Cedex; France, vol. RAN WGI, no. Kansas City, USA; 20080523, May 23, 2008, XP050110541, p. 8, paragraph 4.1-paragraph 4.2; p. 9, paragraph 4.3.1.
(Continued)

*Primary Examiner* — Mang Yeung
(74) *Attorney, Agent, or Firm* — Paul Kuo

(57) ABSTRACT

Aspects describe communicating grant information in a multicarrier wireless communication system. The grant information can be transmitted to mobile devices that have single carrier capability and/or mobile devices that have multicarrier capability. Grant information can be sent in a legacy control region and/or a non-legacy control region.

43 Claims, 17 Drawing Sheets

(56) References Cited

U.S. PATENT DOCUMENTS

| | | |
|---|---|---|
| 7,532,446 B2 | 5/2009 | Cheng et al. |
| 2004/0080883 A1 | 4/2004 | Chatterjee et al. |
| 2004/0105203 A1 | 6/2004 | Ker et al. |
| 2004/0240127 A1 | 12/2004 | Juliano et al. |
| 2005/0035409 A1 | 2/2005 | Ko et al. |
| 2005/0035410 A1 | 2/2005 | Yeo et al. |
| 2005/0057866 A1 | 3/2005 | Mergens et al. |
| 2005/0266846 A1 | 12/2005 | Kim et al. |
| 2006/0050581 A1 | 3/2006 | Luk et al. |
| 2006/0128087 A1 | 6/2006 | Bamji et al. |
| 2006/0135072 A1 | 6/2006 | Kasher et al. |
| 2007/0029646 A1 | 2/2007 | Voldman |
| 2007/0229154 A1 | 10/2007 | Kim et al. |
| 2008/0023767 A1 | 1/2008 | Voldman |
| 2008/0056390 A1* | 3/2008 | Rainbolt et al. ............... 375/260 |
| 2008/0151743 A1* | 6/2008 | Tong et al. .................... 370/204 |
| 2008/0237746 A1 | 10/2008 | Lin et al. |
| 2008/0246086 A1 | 10/2008 | Korec et al. |
| 2008/0285513 A1* | 11/2008 | Jung et al. ..................... 370/329 |
| 2009/0109914 A1* | 4/2009 | McBeath et al. ............... 370/329 |
| 2009/0170269 A1 | 7/2009 | Dutta |
| 2009/0180433 A1* | 7/2009 | Ahn et al. ...................... 370/329 |
| 2010/0032749 A1 | 2/2010 | Shrivastava et al. |
| 2010/0102390 A1 | 4/2010 | Vashchenko et al. |
| 2010/0232077 A1 | 9/2010 | Worley |
| 2012/0074496 A1 | 3/2012 | Jalilizeinali et al. |

FOREIGN PATENT DOCUMENTS

| | | |
|---|---|---|
| WO | 03069806 A1 | 8/2003 |
| WO | 2006105005 A2 | 10/2006 |
| WO | 2006118418 A2 | 11/2006 |
| WO | WO2006125149 | 11/2006 |
| WO | 2007052922 A1 | 5/2007 |
| WO | WO2008043078 A2 | 4/2008 |
| WO | 2010105178 A2 | 9/2010 |
| WO | 2010115137 A1 | 10/2010 |

OTHER PUBLICATIONS

International Search Report & Written Opinion—PCT/US2009/053316—International Search Authority, European Patent Office, Dec. 29, 2009.
Qualcomm Europe: "Multicarrier Control for LTE-Advanced" 3GPP Draft; R1-090862, 3rd Generation Partnership Project (3GPP), Mobile Competence Centre; 650, Route Des Lucioles; F-06921 Sophia-Antipolis.
Cedex ; France, no. Athens, Greece; 20090203, Feb. 3, 2009, XP050318712 . (7 pages).
Thijs, S. et al., "Design methodology of FinFET devices that meet IC-Level HBM ESD targets," Symposium on Electrical Overstress/Electrostatic Discharge (EOS/ESD), Sep. 7-11, 2008, pp. 294-302, ISBN: 978-1-58537-146-4.
Taiwan Search Report—TW098127005—TIPO—Jan. 2, 2013.
Ericsson, "Carrier aggregation in LTE-Advanced", 3GPP Draft, R1-082468, 3rd Generation Partnership Project (3GPP), Mobile Competence Centre, 650, Route Des Lucioles, F-06921 Sophia-Antipolis Cedex, France, vol. RAN WGI, No. Warsaw, Poland, 20080630, Jun. 30, 2008, XP050110739.
Worley et al., "CDM effect on a 65nm SOC LNA", 32nd Electrical Overstress/ Electrostatic Discharge Symposium (EOS/ESD), Oct. 3, 2010, pp. 1-8, IEEE, XP031791670, ISBN: 978-1-58537-182-2.
Yang et al., "BSIM4-based lateral diode model for LNA co-designed with ESD protection circuit", 11th International Symposium on Quality Electronic Design (ISQED), Mar. 22, 2010, pp. 87-91, IEEE, XP031660196, ISBN: 978-1-4244-6454-8, DOI: 10.1109/ISQED.2010.5450396.
Zte,"Technical scope for LTE-advanced evolution",3GPP TSG-RAN WG1#53b R1-082380,Jun. 30, 2008.

* cited by examiner

DOWNLINK GRANTS IN A MULTICARRIER WIRELESS COMMUNICATION SYSTEM

CROSS-REFERENCE

This is an application claiming priority to U.S. Provisional Application No. 61/087,961 entitled "DOWNLINK GRANTS IN A MULTICARRIER WIRELESS COMMUNICATION SYSTEM" filed Aug. 11, 2008, U.S. Provisional Application No. 61/113,443 entitled "DCI DESIGN FOR MULTI CARRIER SYSTEM" filed Nov. 11, 2008, U.S. Provisional Application No. 61/143,146 entitled "DCI DESIGN FOR MULTI CARRIER SYSTEM" filed Jan. 7, 2009, and U.S. Provisional Application No. 61/112,029 entitled "COMMON HARQ PROCESS ID FOR MULTI-CARRIER OPERATION" filed Nov. 6, 2008, and assigned to the assignee hereof and all of which are hereby expressly incorporated by reference herein.

BACKGROUND

I. Field

The following description relates generally to multicarrier wireless communications systems and more particularly to communication of grants in multicarrier wireless communications systems.

II. Background

Wireless communication systems are widely deployed to provide various types of communication content such as voice, data, and so on. These systems may be multiple-access systems capable of supporting communication with multiple users by sharing available system resources (e.g., bandwidth and transmit power). Examples of multiple-access systems include code division multiple access (CDMA) systems, time division multiple access (TDMA) systems, frequency division multiple access (FDMA) systems, 3GPP Long Term Evolution (LTE) systems, orthogonal frequency division multiple access (OFDMA) systems, and so forth.

Generally, a wireless multiple-access communication system can simultaneously support communication for multiple wireless terminals. Each terminal communicates with one or more base stations through transmissions on forward link and reverse link. Forward link (or downlink) refers to communication link from base stations to terminals, and reverse link (or uplink) refers to communication link from terminals to base stations. These communication links may be established through a single-in-single-out, multiple-in-single-out, or multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where $N_S \leq \min\{N_T, N_R\}$. Each of the NS independent channels corresponds to a dimension. MIMO systems can provide improved performance (e.g. higher throughput and/or greater reliability) if additional dimensionalities created by multiple transmit and receive antennas are utilized.

A MIMO system supports time division duplex (TDD) and frequency division duplex (FDD) systems. In a TDD system, forward link and reverse link transmissions are on the same frequency region so that the reciprocity principle allows the estimation of forward link channel from reverse link channel. This enables access point to extract transmit beamforming gain on forward link when multiple antennas are available at access point.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect relates to a method for transmitting grants in a multicarrier wireless communications environment. Method includes determining grant information and identifying a control region to communicate grant information as a function of user device capabilities. Method also includes inserting grant information in identified control region and transmitting grant information in identified control region.

Another aspect relates to a wireless communications apparatus that includes a memory and a processor. Memory retains instructions related to selecting a grant information and identifying a control region to communicate grant information. Memory also retains instructions related to placing grant information in identified control region and transmitting grant information in selected control region. Processor is coupled to memory and is configured to execute instructions retained in memory.

A further aspect relates to a wireless communications apparatus that transmits grants in a multicarrier wireless communications system. Wireless communications apparatus includes means for determining a grant information and means for identifying a control region to communicate grant information as a function of user device capabilities. Wireless communications apparatus also includes means for inserting grant information in identified control region and means for conveying grant information in identified control region. Control region is a legacy control region or a non-legacy control region. According to an aspect, means for determining a grant information evaluates at least one carrier system associated with multicarrier wireless communications system, wherein means for inserting grant information in control region further creates a grant with a common field for at least one of a cyclic redundancy check, a Hybrid Automatic Repeat Request process Identification, a flag, or combinations thereof.

Still another aspect relates to a computer program product that comprises a computer-readable medium. Included in computer-readable medium is a first set of codes for causing a computer to determine a grant information and a second set of codes for causing computer to identify a control region to communicate grant information as a function of user device capabilities. Computer-readable medium also includes a third set of codes for causing computer to place grant information in determined control region and a fourth set of codes for causing computer to communicate grant information in identified control region.

Yet another aspect relates to at least one processor configured to transmit grants in a multicarrier wireless communications system. Processor includes a first module for determining a grant information and a second module for identifying a control region to communicate grant information as a function of user device capabilities. Processor also includes a third module for inserting grant information in identified control region and a fourth module for transmitting grant information in determined control region. Control region is a non-legacy control region or a legacy control region per carrier.

A further aspect relates to a method for receiving grants in a multicarrier wireless communications environment. Method includes determining a location of a control region in one or more carriers for receiving grant information. Method also includes receiving grant information and selectively decoding grant information.

Another aspect relates to a wireless communications apparatus that includes a memory and a processor. Memory retains instructions related to evaluating a location of a control region in one or more carriers for receiving grant information, receiving grant information, and selectively decoding grant information. Processor is coupled to memory and is configured to execute instructions retained in memory.

Still another aspect relates to a wireless communications apparatus that receives grants in a multicarrier wireless communications system. Wireless communications apparatus includes means for determining a location of a control region in one or more carriers for receiving grant information. Wireless communications apparatus also includes means for receiving grant information and means for selectively decoding grant information. Grant information is in a non-legacy control region or a legacy control region per carrier.

A further aspect relates to a computer program product, comprising a computer-readable medium. Included in a computer-readable medium is a first set of codes for causing a computer to determine a location of a control region in a carrier for receiving grant information. Computer-readable medium also includes a second set of codes for causing computer to receive grant information and a third set of codes for causing computer to decode grant information.

Yet another aspect relates to at least one processor configured to receive grants in a multicarrier wireless communications system. Process includes a first module for determining a location of a control region in a carrier for receiving grant information. Also included in processor is a second module for receiving grant information and a third module for selectively decoding grant information.

To the accomplishment of the foregoing and related ends, one or more aspects comprise features hereinafter fully described and particularly pointed out in the claims. The following description and annexed drawings set forth in detail certain illustrative features of one or more aspects. These features are indicative, however, of but a few of various ways in which principles of various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
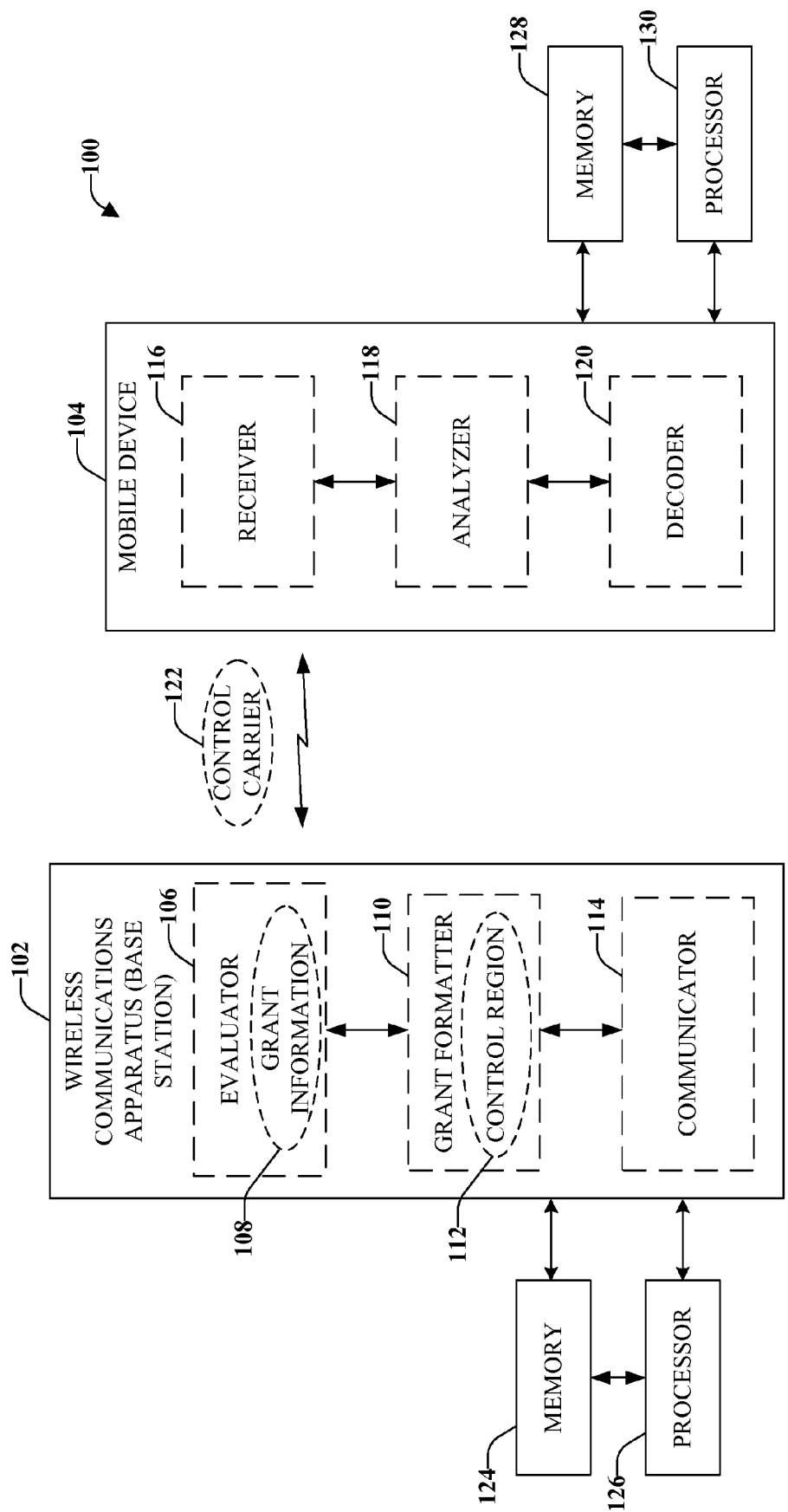
FIG. 1 illustrates a system that utilizes downlink grants in a multicarrier wireless communication system, according to an aspect.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. Components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE), and the like. A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that various systems may include additional devices, components, modules, and so forth, and/or may not include all devices, components, modules, and so on, discussed in connection with the figures. A combination of these approaches may also be used.

Additionally, in the subject description, the word "exemplary" (and variants thereof) is used to mean serving as an example, instance, or illustration. Any aspect or design described herein as "exemplary" is not necessarily to be construed as preferred or advantageous over other aspects or designs. Rather, use of the word "exemplary" is intended to present concepts in a concrete manner.

With reference to FIG. 1, illustrated is a system 100 that utilizes downlink grants in a multicarrier wireless communication system, according to an aspect. System 100 can be a multicarrier system. According to some aspects, system 100 can be configured to provide a single grant that can assign resources for multiple carriers. Alternatively or additionally, system 100 can be configured to jointly code grants so that there are multiple single carrier grants sent on one carrier (e.g., cross carrier operation). Further, in another aspect, system 100 can be configured to provide support to single carrier mobile devices (e.g., legacy devices) and/or mobile device that have multicarrier functionality.

Included in system 100 is a wireless communications apparatus 102 (e.g., base station) and at least one mobile device 104 (e.g. user device). It should be understood that there can be multiple base stations and multiple user devices in a multicarrier communication system, however, only one of each is illustrated for purposes of simplicity.

Wireless communications apparatus 102 includes an evaluator 106 that is configured to determine grant information 108. For example, evaluator 106 can analyze at least one carrier system associated with multicarrier wireless communications system.

Also included in wireless communications apparatus 102 is a grant formatter 110 that is configured to identify a control region 112 to communicate grant information as a function of user device capabilities. In accordance with some aspects, grant formatter 110 selects a first identified control region (e.g., non-legacy control region). According to some aspects, grant formatter 110 selects a second identified control region (e.g., legacy control region) per carrier.

Grant formatter 110 (or another component) can insert grant information 108 in selected control region 112. For example, grant formatter 110 can apply independent assignments with cross-carrier operation. In another aspect, grant formatter 110 can concatenate multicarrier grant information and insert multicarrier grant information in an identified control region, such as a legacy control region. According to some aspects, grant formatter 110 can decide to segment grant information over control region associated with multiple carriers and can further concatenate control segments to form a multicarrier assignment. In accordance with some aspects, grant formatter 110 creates a grant with a common field for at least one of a cyclic redundancy check, a Hybrid Automatic Repeat Request process Identification, a flag, or combinations thereof.

A communicator 114 transmits grant information 108 in identified control region 112. Communicator 114 can send multicarrier grant information as one grant per carrier on the downlink carrier that carries multicarrier grant, according to an aspect.

System 100 can include memory 124 operatively coupled to wireless communications apparatus 102. Memory 124 can be external to wireless communications apparatus 102 or can reside within wireless communications apparatus 102. Memory 124 can store information related to selecting grant information. In an aspect, instructions related to selecting grant information further defines multicarrier Digital Carrier Interface information for a plurality of bandwidth cases and includes, in grant information, a scheduled carrier information, wherein each bandwidth case corresponds to a number of carriers. Additionally or alternatively, instructions related to selecting grant information further includes common fields regardless of a number of assigned carriers and a number of carriers in a multicarrier wireless communications system and adds additional bits that point to a location of a carrier specific Digital Carrier Interface. Further, instructions related to selecting grant information can semi-statically configure a mobile device to be associated with a subset of carriers in a multicarrier wireless communications system and provides a bitmap of the subset of carriers.

Further, memory 124 can store information related to identifying a control region to communicate grant information and placing grant information in identified control region. In accordance with some aspects, instructions related to identifying control region identifies a non-legacy control region or a legacy control region per carrier. In another aspect, instructions related to placing grant information in control region applies independent assignments with cross-carrier operation.

In accordance with some aspects, instructions related to selecting grant information further analyzes at least one carrier system associated with a multicarrier wireless communications system. Instructions related to placing grant information in control region further creates a grant with a common field for at least one of a cyclic redundancy check, a Hybrid Automatic Repeat Request process Identification, a flag, or combinations thereof.

Memory 124 can also store information related to transmitting grant information in selected control region. In an aspect, instruction related to transmitting grant information in identified control region further conveys multicarrier grant information as one grant per carrier on a downlink carrier that carries a multicarrier grant. In yet another aspect, instructions related to transmitting grant information in identified control region further conveys multicarrier grant information as one grant carrying assignment for at least a subset of carriers on a downlink carrier that carriers a multicarrier grant.

At least one processor 126 can be operatively connected to wireless communications apparatus 102 (and/or memory 124) to facilitate analysis of information related to grants in a multicarrier wireless communications network. Processor 126 can be a processor dedicated to analyzing and/or generating information received by mobile device 104, a processor that controls one or more components of system 100, and/or a processor that both analyzes and generates information received by mobile device 104 and controls one or more components of system 100.

In accordance with some aspects, processor 126 is configured to transmit grants in multicarrier wireless communications system. Processor 126 can include a first module for determining grant information and a second module for identifying a control region to communicate grant information as a function of user device capabilities. Processor 126 can also include a third module for inserting grant information in identified control region and a fourth module for transmitting grant information in determined control region. Control region is a non-legacy control region or a legacy control region per carrier.

Mobile device 104 includes a receiver 116 that is configured to receive grant information 108 in selected control region 112. Receiver 116 can receive multicarrier grant information as one grant per carrier on the downlink carrier that carries multicarrier grant, according to an aspect.

An analyzer 118 is configured to determine a location of a control region in a carrier for receiving grant information. For example, analyzer 118 can determine grant information is in a first identified control region (e.g., non-legacy control region). In another example, analyzer 118 can determine grant information is in a second identified control region (e.g., legacy control region) per carrier.

Also included in mobile device 104 is a decoder 120 that is configured to selectively decode received grant information 108. In an example, decoder 120 can identify independent assignments with cross-carrier operation. In accordance with some aspects, decoder 120 can evaluate received grant information 108 and at least one field related to a cyclic redundancy check, a Hybrid Automatic Repeat Request process Identification, a flag, or combinations thereof. The common field can be utilized with multicarrier wireless communications systems.

In accordance with some aspects, system information is communicated to mobile device 104 on a control carrier 122. Use of control carrier 122 in communication system 100 does not place restrictions on bandwidth dedication for each link. For example, uplink (UL), which is communication link from mobile devices 104 to wireless communications apparatus 102, and downlink (DL), which is communication link from wireless communications apparatus 102 (e.g., base station) to mobile devices 104, can be symmetric (e.g., the same for both uplink and downlink). In accordance with some aspects, uplink and downlink can be asymmetric, dependent on traffic demands for uplink and downlink. In addition, there might not be any restrictions on carrier bandwidth, which can be the same across all carriers or can be different across carriers. Additionally, there are no restrictions on uplink/downlink pairing. For example, there can be one-to-one pairing where there is the same number of uplink and downlink carriers, or there can be many-to-one pairing or one-to-many pairing where there are different numbers of uplink and downlink carriers.

Additionally, uplink carriers can be configured to various signal types. For example, uplink carriers can be OFDMA based signals, which can provide flexibility for multiple carrier assignments to mobile devices 104 or uplink. Uplink carrier can also be SC-FDMA based signals, for example, to provide compatibility to existing SC-FDMA systems. In addition, uplink carriers can be OFDMA/SC-FDMA hybrid and support a layered environment by switching between different signal types.

Downlink Grants can support mobile devices 104 configured for single carrier systems (sometimes referred to as legacy devices) and/or mobile devices 104 configured for multicarrier systems. For example, a single-carrier system is employed with LTE (LTE Rel-8, referred to as legacy system) and a multiple-carrier system is employed with LTE-A (LTE Rel-9/Rel-10). However, it should be understood that the disclosed aspects are not limited to these types of communications systems and can be employed with other communications systems.

For a single carrier system, a mobile device (e.g. a legacy device) can receive a downlink grant on a control carrier (e.g., anchor carrier) that assigns resources on the same carrier. Mobile device 104 configured for multicarrier systems can receive a downlink grant on a control carrier (e.g., anchor carrier) that assigns downlink resources on other downlink carriers for which it is defined as an anchor carrier. In accordance with some aspects, mobile device 104 configured for multicarrier systems can receive a downlink grant on a downlink carrier that is not an anchor carrier, wherein downlink carrier assigns downlink resources for that carrier only (similar to downlink grant for legacy devices).

In accordance with some aspects, multicarrier downlink grants are received as one grant on an anchor carrier. Downlink grants can carry assignments for any carrier in multicarrier group. For example, downlink grant can specify joint data coding across carriers, such as a single ACK/NAK (Acknowledgment/Negative Acknowledgment) sent on uplink and bundling (e.g., one bit for all downlink assignments). Downlink grant can specify independent data coding across carriers, such as, multiple ACK/NAKs jointly conveyed on uplink, a new ACK format, PUCCH (Physical Uplink Control Channel) format 2 (joint coding of all ACK bits), PUCCH format 3 (individual or joint coding of all ACKs), and the like.

Memory 128 can be operatively coupled to mobile device 104. Memory 128 can be external to mobile device 104 or can reside within mobile device 104. Memory 128 can store information related to related to evaluating a location of a control region in one or more carriers for receiving grant information, receiving grant information, and selectively decoding grant information. In accordance with some aspects, instructions related to selectively decoding grant information further identifies independent assignments with cross-carrier operation. According to some aspects instructions related to receiving grant information further receives multicarrier grant information as one grant for each of the one or more carriers on a downlink carrier that carries a multicarrier grant. According to another aspect, instructions related to selectively decoding grant information evaluates grant information and at least one common field related to a cyclic redundancy check, a Hybrid Automatic Repeat Request process Identification, a flag, or combinations thereof and utilizes at least one common field with multicarrier wireless communications systems.

At least one processor 130 can be operatively connected to mobile device 104 (and/or memory 128) to facilitate analysis of information related to data sample rearrangement in a communication network. Processor 130 can be a processor dedicated to analyzing and/or generating information received by mobile device 104, a processor that controls one or more components of system 100, and/or a processor that both analyzes and generates information received by mobile device 104 and controls one or more components of system 100.

In accordance with some aspects, processor 130 is configured to receive grants in a multicarrier wireless communications system. Processor 130 can include a first module for determining a location of a control region in a carrier for receiving grant information. Also included in processor is a second module for receiving grant information and a third module for selectively decoding grant information.

Figure 2:
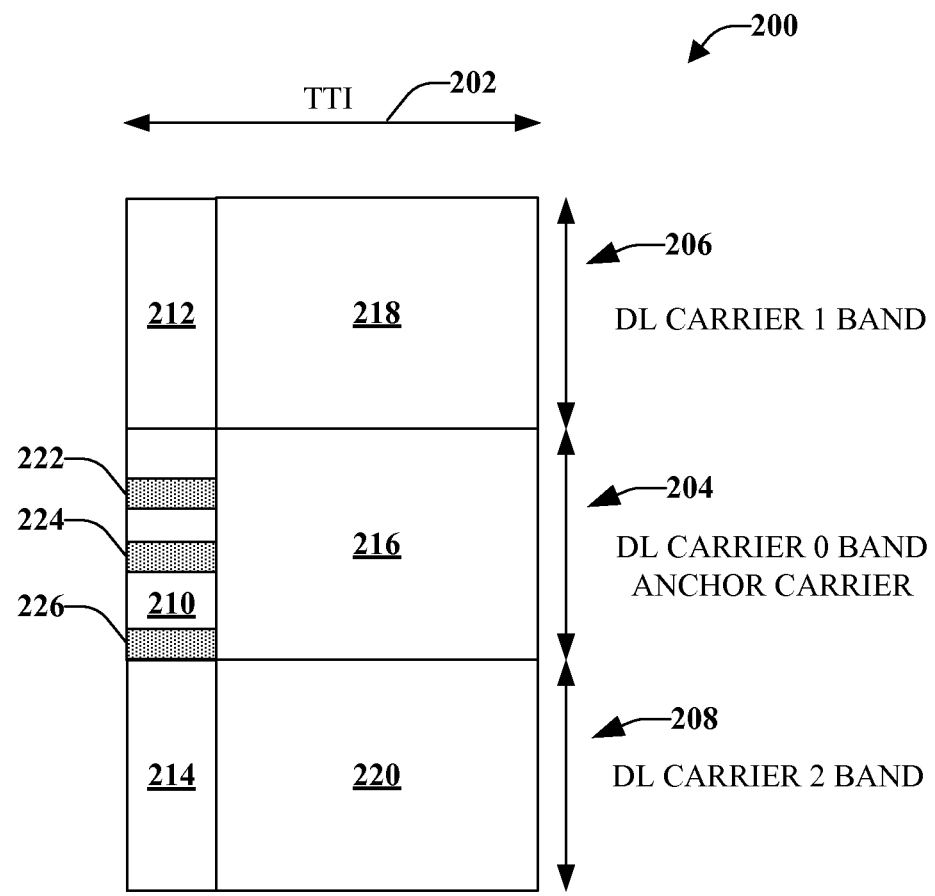
FIG. 2 illustrates a block diagram of a multicarrier downlink grant located in a legacy anchor control region, according to an aspect.

There are a variety of ways an assignment can be conveyed by wireless communications apparatus 102 to multicarrier mobile device 104. FIG. 2 illustrates a block diagram 200 of a multicarrier downlink grant located in an identified anchor control region, according to an aspect. This figure provides an example of one of the various manners that the grant can be assigned.

A single Transmission Time Interval (TTI) is illustrated along horizontal axis 202. Multicarrier communication systems include three downlink (DL) carrier bands: DL carrier 0 band 204 (also referred to as Anchor Carrier), DL carrier 1 band 206, and DL Carrier 2 band 208. Each carrier band includes a control region 210, 212, 214 and a payload region 216, 218, 220. In accordance with some aspects, identified control region can be a legacy control region.

DL carrier 0 band 204 can include multicarrier grant information 222, 224, 226 embedded into control region 210. In this example, multicarrier grant information 222, 224, 226 conveys DL assignments for DL Carrier 0 band 204, DL Carrier 1 band 206, and DL Carrier 2 band 208. By way of example and not limitation, multicarrier grant information 222 can be assignment for DL Carrier 0 band 204, multicarrier grant information 224 can be assignment for DL Carrier 1 band 206, and multicarrier grant information 226 can be assignment for DL Carrier 2 band 208. Thus, these can be independent assignments with cross-carrier operation.

In accordance with some aspects, multicarrier grant information 222, 224, 226 can be embedded in control region 212, 214 of other carrier bands (e.g. DL carrier 1 band 206, DL carrier 2 band 208). According to some aspects, multicarrier grant information 222, 224, 226 can be embedded in more than one carrier band.

In accordance with some aspects, multicarrier grant information 222, 224, 226 are multiple separate multicarrier grant regions within control region 210, as illustrated. However, according to some aspects, multicarrier grant information 222, 224, 226 can be included in a single region (concatenated) in control region 210.

According to some aspects, multicarrier assignment can be communicated as one grant transmitted over a non-legacy control region. Non-legacy control region can be an additional control space in legacy data space. Non-legacy control region can include an FDM structure of multiple control channels. Spanning across multiple OFDM symbols in time can provide better coverage. Further, multiple distributed resource blocks across frequency and hopping can provide diversity. For example, mobile devices can be notified about new control resource in system information. According to some aspects, grants can be carrier specific assignment or across multiple carriers. Further, different grant formats can be utilized in accordance with various aspects.

Figure 3:
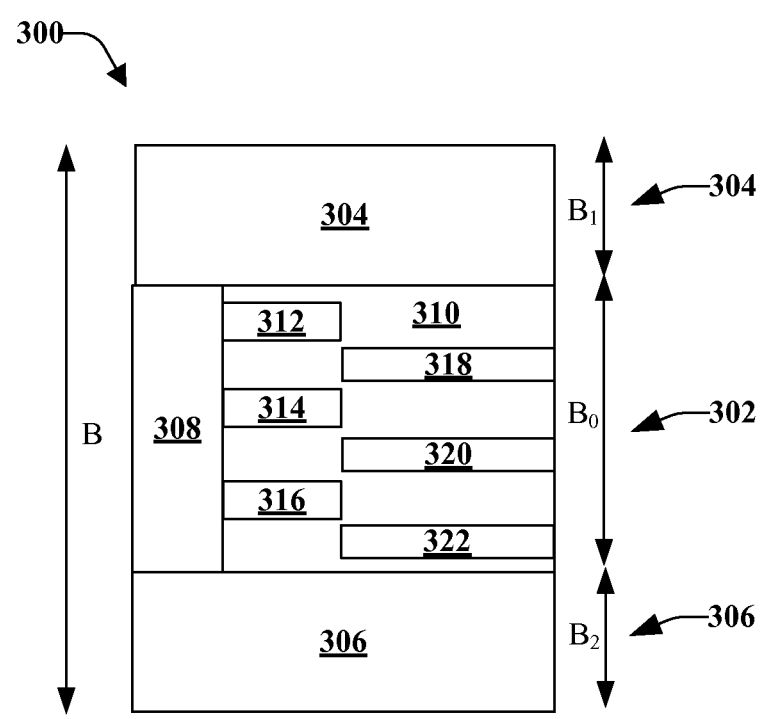
FIG. 3 illustrates an example block diagram of a multicarrier downlink grant located in a non-legacy control region, according to an aspect.

FIG. 3 illustrates an example block diagram 300 of a multicarrier downlink grant located in a non-legacy control region, according to an aspect. In accordance with various aspects, multicarrier assignment can occur as one grant transmitted over a non-legacy control region. In accordance with some aspects, there can be an additional control space in the legacy data space.

Illustrated are three carrier bands, $B_0$ 302, $B_1$ 304, and $B_2$ 306. In this example, $B_0$ 302 includes a legacy control region 308 and a legacy payload region 310. Carrier bands, $B_1$ 304 and $B_2$ 306, are non-legacy payload regions (e.g., non-backward compatible regions). In this example, non-legacy control regions 312, 314, 316, 318, 320, 322 are included in legacy payload region 310 of $B_0$ 302.

In this example, legacy region 308 and payload region 310 are visible to legacy devices as well as multicarrier devices. For example, legacy devices receive control information in legacy payload region 310. Thus, a legacy device would ignore non-legacy control regions 312, 314, 316, 318, 320, and 322 similar to the manner legacy device ignores data assigned to other devices. Multicarrier devices receive control on non-legacy control regions 312, 314, 316, 318, 320, and 322.

Figure 4:
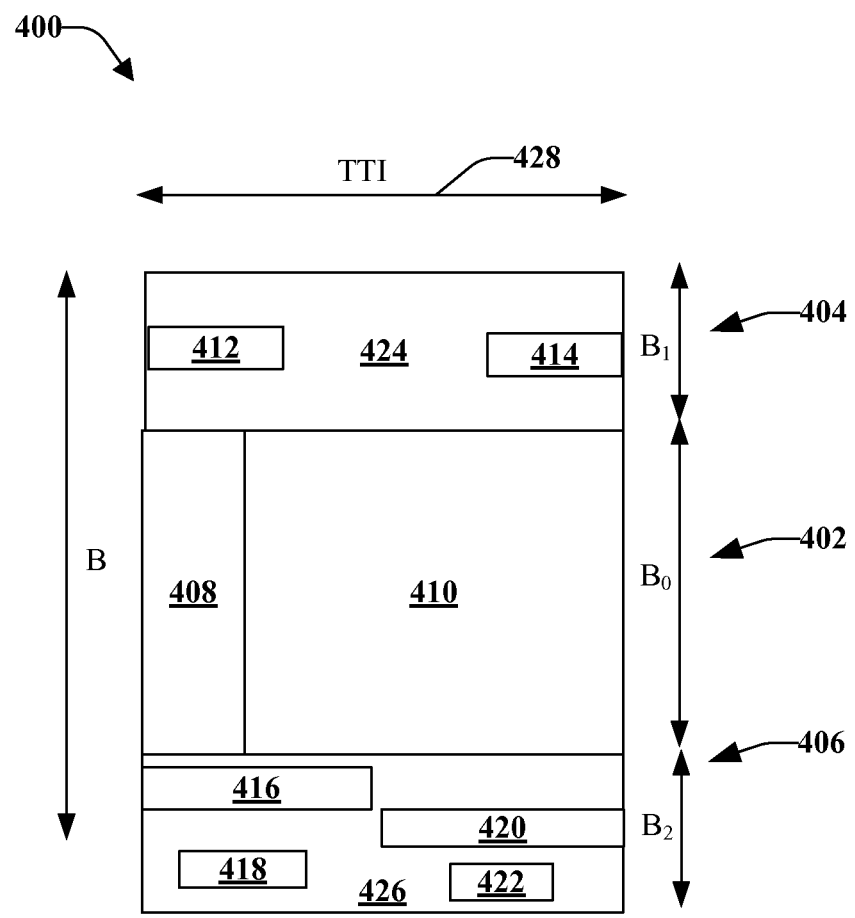
FIG. 4 illustrates another example block diagram of a multicarrier DL grant located in a non-legacy control region, according to an aspect.

FIG. 4 illustrates another example block diagram 400 of a multicarrier downlink (DL) grant located in a non-legacy control region, according to an aspect. This block diagram 400 is similar to schematic representation 300 of FIG. 3 and includes three carrier bands, $B_0$ 402, $B_1$ 404, and $B_2$ 406. In this example, $B_0$ 402 includes a legacy control region 408 and a legacy payload region 410. Further, control regions 412, 414, 416, 418, 420, and 422 are placed within multicarrier control regions 424 and 426 of carrier bands $B_1$ 404 and $B_2$ 406.

Duration and placement of control regions 412, 414, 416, 418, 420, and 422 can be varied. For example, a single TTI is represented along horizontal axis 428. A single TTI can comprise two slots, according to an aspect. Thus, for FIG. 3, duration of two control regions (e.g., control regions 314 and 320) lasts the entire subframe or TTI (except for first subframe, which includes identified region 308). In FIG. 4, control regions can be a duration that is all or a portion of each subframe.

Figure 5:
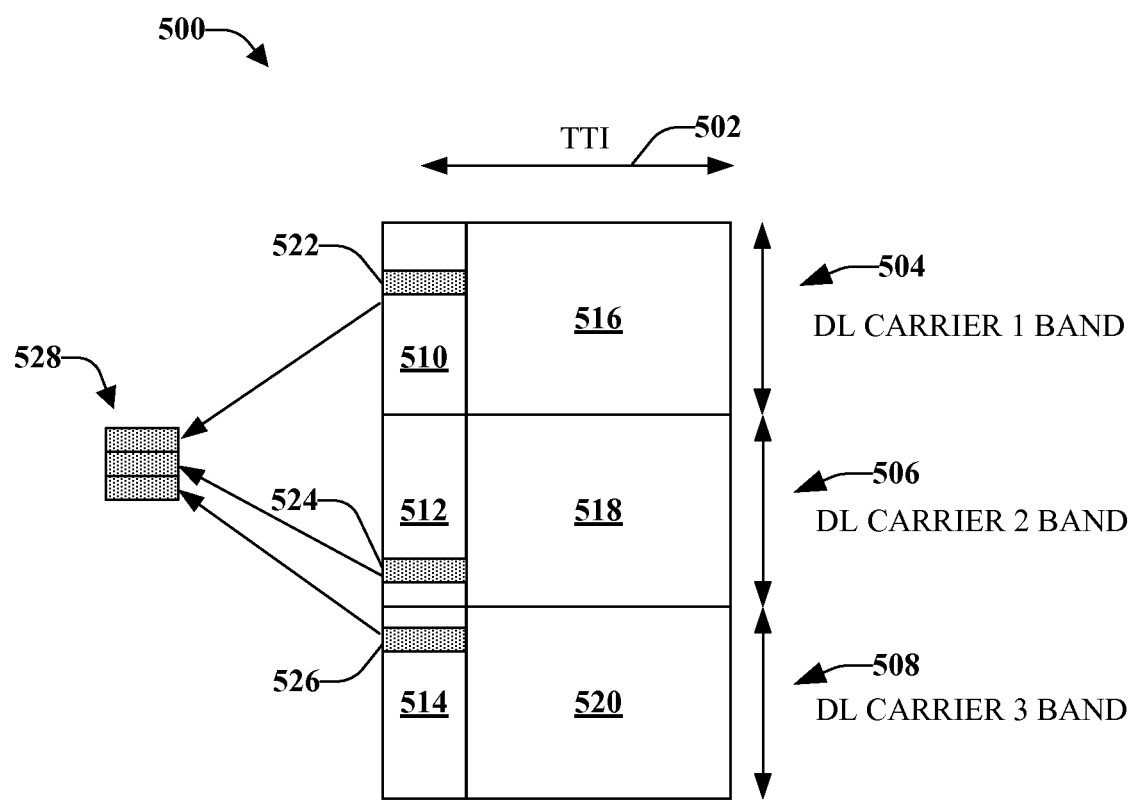
FIG. 5 illustrates an example block diagram of a multicarrier downlink grant with nested carriers, according to an aspect.

FIG. 5 illustrates an example block diagram 500 of a multicarrier downlink grant with nested carriers, according to an aspect. Multicarrier assignment can be communicated as one grant segmented over control region of multiple carriers, according to an aspect. Control segments can be concatenated to form multicarrier assignment. Multicarrier grant can carry assignments for the set of carriers in multicarrier group. Multicarrier grant can specify joint data coding across carriers, such as, single ACK/NAK and bundling (e.g., one bit for all DL assignments). In accordance with some aspects, multicarrier grant can specify independent data coding across carriers (e.g., multiple ACK/NAKS independently or jointly conveyed).

A single Transmission Time Interval (TTI) is illustrated along horizontal axis 502. Multicarrier communication systems include three carrier bands, DL Carrier 1 Band 504, DL Carrier 2 Band 506, and DL Carrier 3 Band 508. Each carrier band includes a legacy control region 510, 512, 514 and a payload region 516, 518, 520. Nested in each legacy control region 510, 512, 514 (or at least on a subset of legacy control regions) is a multicarrier control region 522, 524, 526. In accordance with some aspects, multicarrier control regions 522, 524, 526 can be concatenated 528 such as by a mobile device for decoding purposes.

In accordance with some aspects, although FIG. 5 illustrates a single multicarrier control region 522, 524, 526 in each legacy control region 510, 512, 514, there can be multicarrier control regions in a subset of legacy control regions 510, 512, 514.

Figure 6:
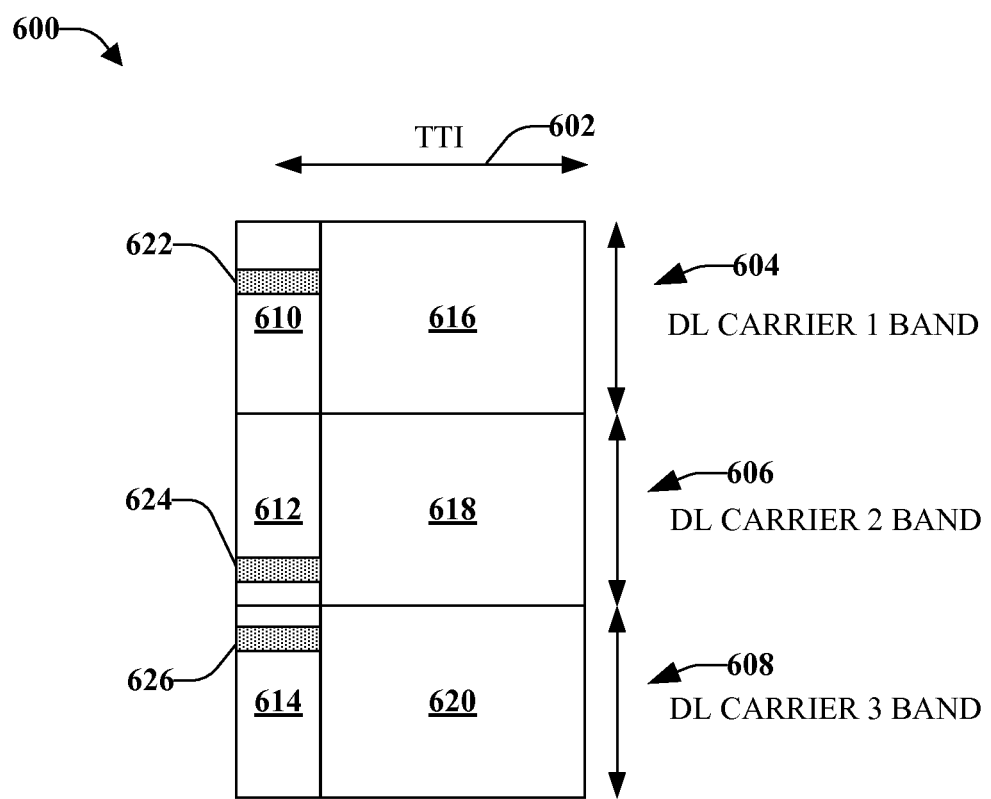
FIG. 6 illustrates an example block diagram of a multicarrier DL grant with an identified control region per carrier, according to an aspect.

FIG. 6 illustrates an example block diagram 600 of a multicarrier DL grant with an identified control region per carrier, according to an aspect. In accordance with this aspect, multicarrier DL grant information can be communicated as one grant per carrier that is sent on the same DL carrier for which it carriers grant.

A single TTI 602 is illustrated along horizontal axis and there are three carriers, DL Carrier 1 Band 604, DL Carrier 2 Band 606, and DL Carrier 3 Band 608. Each carrier includes a legacy control region 610, 612, 614 and a payload region 616, 618, 620. Included in each legacy control region 610, 612, 614, is a multicarrier control region 622, 624, 626. Multicarrier control region 622 includes grant information for DL Carrier 1 Band 604, multicarrier control region 624 includes grant information for DL Carrier 2 Band 606, and multicarrier control region 626 includes grant information for DL Carrier 3 Band 608.

It should be noted that although this example illustrates a single multicarrier control region 622, 624, 626 in each legacy control region 610, 612, 614, the disclosed aspects are not limited to this example. In another aspect, there can be any desired number of multicarrier control regions in legacy control region 610, 612, 614. Alternatively or additionally, there can be different numbers of multicarrier control regions in different carriers or no multicarrier control regions in selected, or all, carriers.

Although the disclosed aspects related to multicarrier include support for single carrier control, there are aspects that can improve multicarrier functionality. The following aspects relate to multicarrier downlink (DL) assignments and uplink (UL) assignments. Multicarrier assignments can be more suitable for multicarrier configuration since these assignments can mitigate overhead when compared to single carrier assignments. Alternatively or additionally, multicarrier assignment can reduce mobile device assignment monitoring to one carrier.

Single carrier assignment sent on one DL carrier assigns DL/UL resources to target mobile device on that same DL carrier/corresponding UL carrier. A multicarrier grant can assign resources on multiple carriers and has smaller overhead since common fields across carriers (e.g., CRC, Hybrid Automatic Repeat request (HARQ) process identification (ID), flags, and so on) are not repeated as in the case of multiple single carrier grants utilized for multicarrier assignment.

Multicarrier assignment could be communicated on any DL carrier and could assign resources for any DL/UL carrier(s). Anchor carriers can be utilized to provide reliable control coverage and can be utilized to communicate multicarrier assignments, which can provide more reliable data scheduling on carriers on which control may not be reliably conveyed. Radio Resource Control (RRC) signaling can inform mobile device if there are additional DL carrier(s) to monitor for possible multicarrier assignments.

Since multicarrier assignment can be communicated as one grant for multiple carriers, a number of different schemes can be utilized for Digital Carrier Interface (DCI) design (e.g. DCI formatting). DL grant overhead can be related to Modulation and Coding Scheme (MCS) information for each carrier. For example, a single MC (multi-carrier) grant can have additional bits for separate MCS for each carrier (e.g. about five bits per carrier). Alternatively or additionally, there can be multiple LTE Rel-8 based grants sent on each carrier separately, which can have additional bits for MCS, flags, HARQ process ID, CRC per carrier, and so forth (e.g., about twenty-five bits per carrier).

Now will be provided examples of multicarrier assignment formats for DL and UL, discussed as four different schemes (Scheme 1, Scheme 2, Scheme 3, and Scheme 4). Depending on the type of mobile device carrier association configuration, multicarrier DL grant DCI formats can be defined for semi-static mobile device carrier configuration and/or dynamic mobile device carrier configuration. Semi-static mobile device carrier configuration can be utilized where the number of assigned carriers does not fluctuate much compared to the number of semi-statically configured carriers for that mobile device. Dynamic mobile device carrier configuration allows dynamic assignment format adaptation to the number of carriers that are actually assigned. Dynamic mobile device carrier configuration can be utilized where significant variation in the number of assigned carriers is expected.

Semi-static mobile device carrier configuration assumes that a mobile device is semi-statically configured to be associated with the subset of all carriers in system. Bitmap of N-1 bits (where N is the number of carriers) with information on which carriers are utilized can be communicated to mobile device by RRC signaling. The DCI format to utilize can be determined by the number of carriers for which a mobile device can expect the assignment. In terms of blind decoding, semi-static mobile device carrier configuration, as disclosed herein, has only one multicarrier DCI format (in addition to Rel-8 formats).

With reference to Scheme 1, multicarrier DCI formats can be defined for several bandwidth cases (e.g., multiple of 110 Resource Blocks (RBs)): 220 RBs, 330 RBs, 440 RBs, 550 RBs. Each bandwidth case corresponds to the number of carriers. For example, 220 RBs corresponds to two carriers, 330 RBs corresponds to three carriers, 440 RBs corresponds to four carriers, 550 RBs corresponds to five carriers, and so forth. The actual bandwidth of a carrier can be smaller than 20 MHz (110 RBs), however, the resource addressing space should be provisioned for the maximum possible bandwidth per carrier.

In accordance with some aspects, resource allocation granularity can be increased (as compared to Rel-8) to mitigate overhead. For example, 8 RB granularity can be utilized for bandwidths 220 RBs, 330 RBs, and 440 RBs, and 10 RB granularity can be utilized for 550 RBs bandwidth.

Table 1 below illustrates multicarrier DCI format for DL-SCH assignments for one code word and is based on Rel-8 Format 1. One MCS and HARQ information can be defined per carrier. For example, assignment for two carriers can correspond to 220 RBs bandwidth and there can be provided information for two MCS (one per carrier) and corresponding HARQ information (composite bandwidth of those two carriers can be less than 220 RBs). There is a common HARQ process ID across carriers. Multiple carriers can be handled in a similar manner as multiple code words in MIMO format. Also, a data indicator and redundancy version can be provided per carrier.

TABLE 1

| Field | 110 $N_{RB}$ Bit-width | 220 $N_{RB}$ Bit-width | 330 $N_{RB}$ Bit-width | 440 $N_{RB}$ Bit-width | 550 $N_{RB}$ Bit-width |
|---|---|---|---|---|---|
| Resource allocation header | 1 | 1 | 1 | 1 | 1 |
| Resource allocation | 25 | 28 | 42 | 55 | 55 |
| MCS | 5 | 10 | 15 | 20 | 25 |
| HARQ process id | 3 | 3 | 3 | 3 | 3 |
| New data indicator | 1 | 2 | 3 | 4 | 5 |
| Redundancy version | 2 | 4 | 6 | 8 | 10 |
| TPC | 2 | 2 | 2 | 2 | 2 |
| Downlink Assignment Index | 0 | 0 | 0 | 0 | 0 |
| CRC | 16 | 16 | 16 | 16 | 16 |
| Total: | 55 | 66 | 88 | 109 | 117 |

With reference to Table 1, Resource allocation header can provide an indication of resource allocation type "0" or type "1". Resource allocation is a bit-map with allocation for type "0", set indication and bitmap therein for type "1". Thirty-two levels of MCS (compute TBS from RB assignment) per carrier. HARQ process ID can be, for example, 3b for FDD and 4b for TDD. New data indicator (NDI) can be 1 bit per carrier and redundancy version can be two bits per carrier. TPC is TPC command for PUCCH. Downlink assignment index can be 0b for FDD and 2b for TDD. CRC can be masked by mobile device MAC ID.

Multicarrier DCI format for DL-SCH assignments for MIMO (Open Loop and Closed Loop) based on Rel-8 Format 2 are provided in Table 2 below. In accordance with this aspect, multicarrier DCI format defines two code words per carrier and there is a common HARQ process ID across carriers and code words. HARQ swap flag, for example, can be one bit per carrier to indicate whether the two code words of that carrier should be swapped. A new data indicator (NDI) and redundancy version can be per code word per carrier and precoding information can be defined per carrier. For example, the number of reserved bits can be two bits for rank indicator (RI) and/or N*4 bits for precoding information (where N is the number of carriers).

TABLE 2

| Field | 110 $N_{RB}$ Bit-width | 220 $N_{RB}$ Bit-width | 330 $N_{RB}$ Bit-width | 440 $N_{RB}$ Bit-width | 550 $N_{RB}$ Bit-width |
|---|---|---|---|---|---|
| Resource allocation header | 1 | 1 | 1 | 1 | 1 |
| Resource allocation | 25 | 28 | 42 | 55 | 55 |
| TPC | 2 | 2 | 2 | 2 | 2 |
| HARQ process id | 3 | 3 | 3 | 3 | 3 |
| HARQ swap flag | 1 | 2 | 3 | 4 | 5 |
| Downlink Assignment Index | 0 | 0 | 0 | 0 | 0 |
| MCS - 1st codeword | 5 | 10 | 15 | 20 | 25 |
| New data indicator - 1st codeword | 1 | 2 | 3 | 4 | 5 |
| Redundancy version - 1st codeword | 2 | 4 | 6 | 8 | 10 |
| MCS - 2nd codeword | 5 | 10 | 15 | 20 | 25 |
| New data indicator - 2nd codeword | 1 | 2 | 3 | 4 | 5 |
| Redundancy version - 2nd codeword | 2 | 4 | 6 | 8 | 10 |
| Precoding information | 6 | 10 | 14 | 18 | 22 |
| CRC | 16 | 16 | 16 | 16 | 16 |
| Total: | 70 | 94 | 129 | 163 | 184 |

With reference to Table 2, resource allocation header field provides an indication of resource allocation type "0" or type "1". Resource allocation includes a bit-map with allocation for type "0", set indication and bitmap therein for type "1". TPC is TPC command for PUCCH. HARQ process ID can be 3b for FDD and 4b for TDD. HARQ swap flag indicates whether the two transport blocks within a carrier should be swapped. Downlink Assignment Index field can be 0b for FDD and 2b for TDD. MCS—$1^{st}$ codeword field can be thirty-two levels of MCS (compute TBS from RB assignment) per carrier. New data indicator—$1^{st}$ codeword can be one bit per carrier and redundancy version—$1^{st}$ codeword can be two bits per carrier. Precoding information field number of bits depends on the number of antenna ports P and whether it is closed loop or open loop spatial multiplexing. Interpretation of precoding information can also depend on the number of enabled code words. CRC can be masked by mobile device MAC ID.

DCI formats, as discussed above with reference to Table 1 and Table 2 for semi-static mobile device carrier configuration can be utilized for the case when carrier bandwidths are smaller than 20 MHz. DCI formats can be defined such that the number of RBs corresponds to the sum over all carriers and the number of MCS fields and HARQ information is appropriately scaled with the number of carriers. For example, if there are four carriers, each of 25 RBs (5 MHz), the appropriate DCI format might be the one address 100 RBs with four fields for MCS information (per code word for MIMO case) and four fields for each of NDI and RV (per code word for MIMO case). This aspect can conserve overhead when carrier bandwidths are smaller than 20 MHz (110 RBs), as the resource addressing space does not have to provision for the maximum possible bandwidth (20 MHz) per carrier.

It should be noted that in Table 1 and Table 2, TPC is shown to be common across all bandwidths. However, in accordance with some aspects, TPC can be different across bandwidths. For example, TPC field can be twice the number of carriers.

Continuing with reference to Scheme 1, there can be one MC format used depending on the number of utilized carriers (e.g., only one additional format for blind decoding of Physical Downlink Control Channel (PDCCH) as compared to Rel-8). Regardless of the number of carriers actually assigned to mobile device, the format corresponding to the number of carriers in system can be utilized. For example, if there are five carriers in system, but only two carriers are assigned to mobile device, the format corresponding to 550 RBs would be utilized (which might include redundant overhead).

Scheme 2: in accordance with some aspects, in addition to Scheme 1 for DL MC DCI formats, there can also be inclusion of information on which carriers are scheduled. For example, there can be about five bits to cover a maximum number of provisioned carriers. Further, it is possible to have four bits if the last carrier is implicitly taken into account. For example, DCI format for 220 RBS can be utilized where two MCS for two carriers are defined. If scheduled carriers field is 1000, this can indicate that carrier 1 and carrier 5 are scheduled. In another example, if scheduled carriers field is 1010, it can indicate that carrier 1 and carrier 3 are scheduled.

Alternatively or additionally, all MC format can be used depending on the number of utilized carriers (e.g., four additional formats for blind decoding of PDCCH as compared to Rel-8). Further, additional bits for scheduled carriers might not be needed for 550 RB format and there can be an absolute number of bits needed for MC DCI increased by 4 (5) bits for three DCI format (as compared to Scheme 1). Further, there is no redundant overhead when less than a maximum number of carriers in system are scheduled for a mobile device. This can result in significant savings. For example, in MIMO mode, if two carriers are scheduled in a five carrier system, DCI with (94+4) bits is used instead of 184 bits (representing 86 bits of savings).

In accordance with some aspects, Scheme 3, which is a dynamic mobile device carrier configuration can be utilized. Dynamic mobile device carrier configuration assumes that a mobile device can dynamically be assigned any number of carriers configured in the cell to which mobile device is connected. This can enable mobile device to dynamically adapt assignment overhead to the actual assignment. This is different from semi-static approach where assignment overhead corresponds to the number of configured carriers although mobile device could be assigned resources only on a subset of carriers.

DL assignment for dynamic carrier configuration can include two parts: carrier common DCI format and carrier specific DCI format. With dynamic mobile device carrier configuration there is no redundant overhead when less than a maximum number of carriers in system is scheduled for a mobile device. Dynamic mobile device carrier configuration can provide strong CRC protection, since there are two CRCs, one CRC for each DCI included in assignment.

Carrier common DCI format can contain common fields regardless of the number of assigned carriers and number of carriers in system (e.g., header Transmit Power Control (TPC), HARQ process ID (e.g., six bits)). Scheme 3 can correspond to DCI format as defined in Scheme 1 but without header, TPC, and HARQ process ID, would follow after carrier common DCI format. In accordance with some aspects, there is only one additional format for blind decoding of PDCCH as compared to Rel-8 (e.g., the assignment specific formats are deterministic in terms of size and location once the common format is decoded). Scheme 3 can provide the advantage of stronger CRC protection (e.g. two CRCs).

In accordance with some aspects, there is no redundant overhead when less than a maximum number of carriers in system are scheduled for mobile device. An absolute number of bits needed for MC DCI can be increased by 21 (13) bits as compared to Scheme 1 (e.g., five bits for information about which carriers are scheduled and sixteen or eight bits for common message CRC). An absolute number of bits needed for MC DCI increased by 16 (8) bits as compared to Scheme 2 (e.g., 16 or bits for common message bits for CRC). Moreover, additional bits could be added to the carrier common DCI to point to the location of the specific DCI. This can provide more flexibility than in the case where the specific DCI just follows carrier common DCI. Scheme 3 can be approximately the same size as Format 1C or Rel-8, such as 27 verses 28 bits. For example, it can be possible to make these formats the same size by reducing one bit in the common MC DCI format (e.g., with no additional blind decodes as compared to Rel-8 and to distinguish them by using an altered CRC mask).

Table 3 illustrates a carrier common DCI format.

TABLE 3

| Field | 220 $N_{RB}$ Bit-width | 330 $N_{RB}$ Bit-width | 440 $N_{RB}$ Bit-width | 550 $N_{RB}$ Bit-width |
|---|---|---|---|---|
| Resource allocation header | 1 | 1 | 1 | 1 |
| Scheduled carriers | 5 | 5 | 5 | 5 |
| HARQ process id | 3 | 3 | 3 | 3 |
| TPC | 2 | 2 | 2 | 2 |
| CRC | 16 | 16 | 16 | 16 |
| Total: | 27 | 27 | 27 | 27 |

In accordance with some aspects, Header, TPC, and HARQ process ID can be 6 bits and information about which carriers are scheduled can be N bits (1 bit per carrier). Carrier common DCI format size (e.g., 27 bits) can be similar in size to Format 1C for Rel-8 (e.g., 26 bits). However, according to some aspects, the sizes can be made the same by reducing one bit in the common MC DCI format. For example, there can be no additional blind decodes as compared to Rel-8, and, to distinguish, an altered CRC mask can be utilized.

Carrier specific DCI format follows after the carrier common DCI format. Additional bits can be added to the carrier common DCI to point to the location of the carrier specific DCI. This can provide more flexibility than the case where the specific DCI just follows the carrier common DCI.

Carrier common DCI formats are similar to formats defined for semi-static carrier configuration, however, carrier common DCI formats might not have header, TPC, and HARQ process ID. The carrier specific DCI format utilized can be determined by the number of scheduled carriers contained on the carrier common DCI. In accordance with some aspects, there is only one multicarrier DCI format in addition to the Rel-8 formats for blind decoding.

Scheme 4. Mobile device could be semi-statically configured to be associated with the subset of all carriers in system (e.g. instead of dynamically conveying information about which carriers are scheduled in grant (e.g., Scheme 2)). Further, bitmap of which carriers are utilized is provided to mobile device by RRC signaling (e.g., N-1 bits, where N is the number of carriers). DCI format for mobile device to use can be determined by the number of carriers mobile device can expect the assignment. For example, mobile device would try to blind decode only one MC DCI format in addition to Rel-8 formats or MC DCI format is one of the formats defined by Scheme 1.

To recap the above described schemes, Scheme 4 corresponds to a semi-static mobile device carrier configuration. Scheme 1 is similar to Scheme 4, however, each mobile device is not RRC configured for a specific number of carriers, but the grant format used is the same for all mobile devices and depends on the number of carriers in system. Scheme 3 corresponds to dynamic carrier configuration. Scheme 2 is similar to Scheme 1, with additional bits to indicate for which exact carrier(s) a mobile device is scheduled on. The difference with respect to Scheme 1 is that formats for all possible number of carriers could be utilized (not just one corresponding to the number of carriers in system), and mobile device blindly decodes all possibilities to find the right one for each TTI.

In accordance with some aspects, MIMO assignment formats can include common Hybrid Automatic Repeat Request (HARQ) process Identification (ID) for both code words. A common HARQ process ID can be utilized with a new data indicator (NDI) to enable asynchronous HARQ operation and can be extended to multicarrier systems. In multicarrier systems, a multicarrier grant can be designed so that there is a common HARQ process ID and per carrier and per code word NDI for MIMO operation. An advantage of this is mitigation of overhead by having per carrier HARQ process ID without loss of flexibility and/or performance.

In accordance with some aspects, a universal grant can be constructed with a format that includes common fields for at least one of a cyclic redundancy check (CRC), a HARQ process ID, and/or a flag. This universal grant allows these common fields to be utilized with multicarrier systems, which can more efficiently utilize bandwidth since these fields do not need to be repeated (as would be the case with separate grants for each carrier).

According to some aspects, a universal grant can be received and utilized by mobile device. Universal grant can be analyzed and at least one common field that includes information for a CRC, a HARQ process ID, and/or a flag can be identified. Common field information can be employed with two or more carrier systems.

Figure 7:
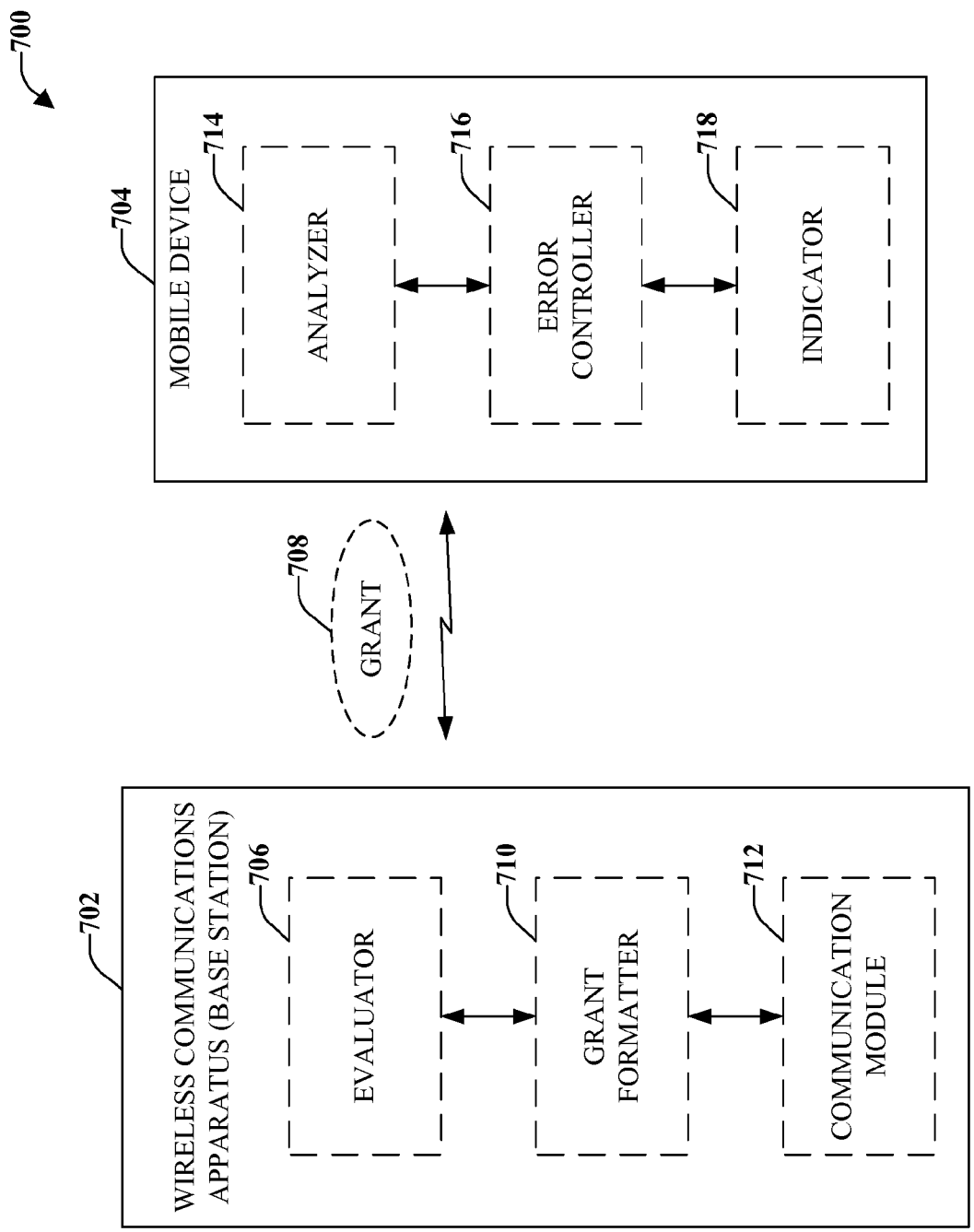
FIG. 7 illustrates a system for creating a universal grant that includes common fields, according to an aspect.

With reference to FIG. 7, illustrated is a system 700 for creating a universal grant that includes common fields, according to an aspect. System 700 includes at least one wireless communications apparatus 702, which can be a base station, and at least one mobile device 704. Included in wireless communications apparatus 702 is an evaluator 706 that is configured to identify available carriers in multicarrier system 700 for which a grant 708 can be created. Grant 708 can be formatted to include common fields related to a CRC, HARQ process ID, a flag, or combinations thereof. A grant formatter 710 can enforce a grant format that can enable a multitude of carrier systems to leverage and employ common information within the fields. Grant 708 is sent to mobile device 704 by a communication module 712.

Mobile device 704 can include an analyzer 714 that is configured to receive grant 708 and evaluate common fields, common information, and so forth, associated with grant 708. For example, analyzer 714 can identify at least one of a CRC, a HARQ process ID, and/or a flag included within grant 708. Common information, common fields, and so forth, can be employed by mobile device 704 in connection with multicarrier system 700.

Also included in mobile device 704 is an error controller 716 that is configured to leverage common information, common fields, and so forth, in grant 708 to facilitate error checking and control. Error controller 716 can employ HARQ process with HARQ process ID across multicarriers. Thus, common data or common information can enable the HARQ process to be implemented regardless of the carrier.

Additionally, mobile device 704 can include an indicator 718 that is configured to utilize common fields and respective common or shared information in connection with New Data Indicator (NDI). Indicator 718 can utilize NDI in conjunction with HARQ process ID information and/or HARQ process. Further, indicator 718 can leverage common fields and related information across multicarrier system 700.

In accordance with some aspects, DL grant overhead in multicarrier system 700 can be different depending on how HARQ and MCS information for each carrier are conveyed by communication module 712 to mobile device 704. For example, a single multicarrier grant can have additional bits for separate MCS for each carrier (e.g., 5 bits per carrier). In another example, multiple Rel-8 based grants sent on each carrier separately can have additional bits for MCS, flags, HARQ process ID, CRC per carrier (e.g., 25 bits per carrier).

According to various aspects, a multiple carrier (MC) grant format is provided. MC Grant can include common fields such as CRC, HARQ process ID, and flags. Utilization of common fields can mitigate repeating these fields, which would happen with a separate grant per carrier. Further, if separate, per carrier Rel-8 grant is utilized, then separate HARQ process has to be defined per carrier. With the disclosed aspects, if multicarrier grant is utilized, common HARQ process can be utilized across all carriers. This allows for the extension of the MIMO multiple code words design. Further, the disclosed aspects are applicable to MIMO case and SIMO case. In accordance with some aspects, a NDI is utilized in conjunction with HARQ process ID information. For example, NDI can be per code word per carrier in MIMO case and NDI can be per carrier in SIMO case. Further, according to the disclosed aspects, full flexibility in terms of assigning data on some or all carriers at a certain TTI, with or without code word blanking (for MIMO) is provided. Additionally, the disclosed aspects can provide reduced overhead with respect to separate HARQ ID per carrier (e.g., three bits versus N*3, where N is the number of carriers).

In accordance with some aspects, evaluator 706 determines automatically (or based on a manual input) a scheme to utilize (e.g., Scheme 1, Scheme 2, Scheme 3, or Scheme 4 as discussed above). Evaluator 706 can analyze various criteria including, but not limited to, a number of blind decodes, a false alarm probability, a probability of error, and/or a smallest overhead when less than a maximum number of carriers in system 700 are scheduled for mobile device 704. Based on the evaluation, grant formatter 710 can implement the chosen scheme. In accordance with some aspects, the scheme to be utilized can be pre-defined.

In view of the exemplary systems shown and described above, methodologies that may be implemented in accordance with the disclosed subject matter, will be better appreciated with reference to the following flow charts. While, for purposes of simplicity of explanation, methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described herein. It is to be appreciated that functionality associated with the blocks may be implemented by software, hardware, a combination thereof or any other suitable means (e.g. device, system, process, component). Additionally, it should be further appreciated that methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 8:
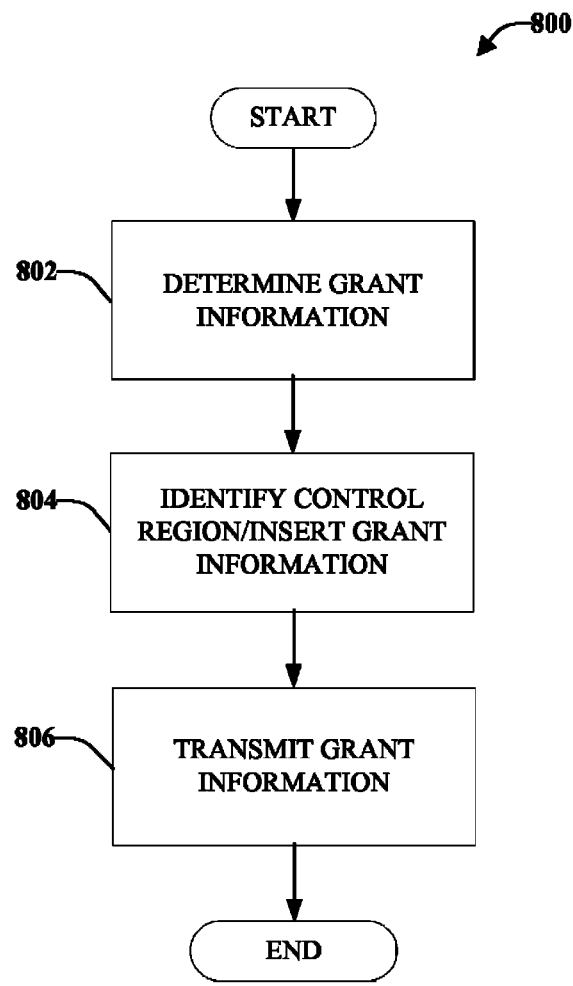
FIG. 8 illustrates a method for transmitting a grant in a multicarrier wireless system, according to an aspect.

FIG. 8 illustrates a method 800 for transmitting a grant in a multicarrier wireless system, according to an aspect. Method 800 starts, at 802, when grant information is determined. In accordance with some aspects, determining grant information includes defining multicarrier Digital Carrier Interface information for a plurality of bandwidth cases, wherein each bandwidth case corresponds to a number of carriers.

According to some aspects, determining grant information comprises including common fields regardless of a number of assigned carriers and a number of carriers in multicarrier wireless communications environment. Method 800 can include adding additional bits that point to a location of a carrier specific Digital Carrier Interface. According to some aspects, determining grant information further comprises semi-statically configuring a user device to be associated with a subset of carriers in multicarrier wireless communications environment and providing a bitmap of the subset of carriers.

At 804, a control region to communicate grant information is identified as a function of user device capabilities and grant information is inserted in control region. In accordance with some aspects, identifying control region comprises selecting a non-legacy control region. According to another aspect, identifying control region comprises selecting a legacy control region per carrier.

Inserting grant information in control region can include applying independent assignments with cross-carrier operation. In accordance with some aspects, inserting grant information in control region includes concatenating multicarrier grant information and inserting multicarrier grant information in a legacy control region. According to another aspect, inserting grant information in control region includes segmenting grant information over control region associated with multiple carriers and concatenating control segments to form a multicarrier assignment.

Grant information is transmitted, at 806, in identified control region. Transmitting grant information can include sending multicarrier grant information as one grant per carrier on downlink carrier that carries multicarrier grant.

In accordance with some aspects, determining grant information comprises analyzing at least one carrier system associated with multicarrier wireless communications system. Inserting grant information in control region comprises creating a grant with a common field for at least one of a cyclic redundancy check, a Hybrid Automatic Repeat Request process Identification, a flag, or combinations thereof.

In accordance with some aspects, a computer program product can include a computer-readable medium that comprises codes for carrying out various aspects of various methods. Computer-readable medium can include a first set of codes for causing a computer to determine a grant information. Also included in computer-readable medium is a second set of codes for causing computer to identify a control region to communicate grant information. Further, computer-readable medium includes a third set of codes for causing computer to place grant information in determined control region and a fourth set of codes for causing computer to communicate grant information in identified control region.

Figure 9:
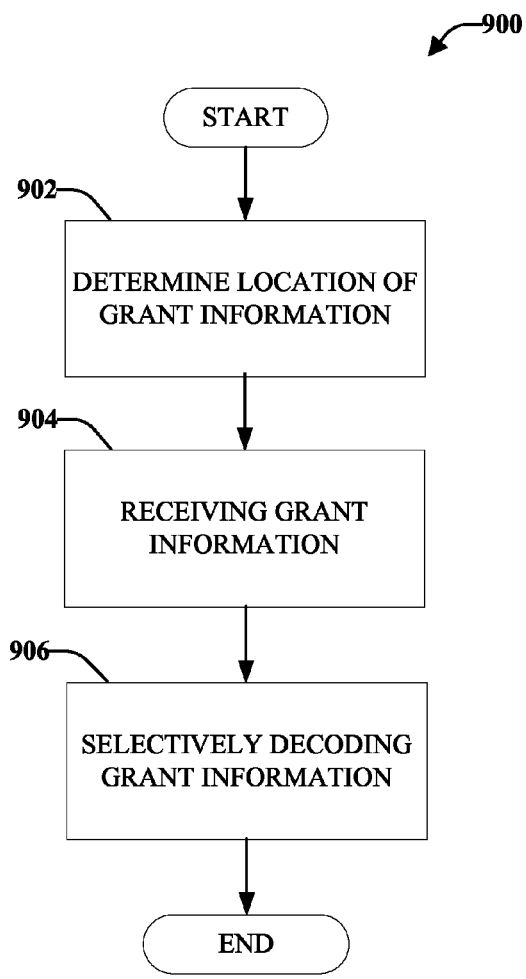
FIG. 9 illustrates a method for receiving a grant in a multicarrier wireless system, according to an aspect.

FIG. 9 illustrates a method 900 for receiving a grant in a multicarrier wireless system, according to an aspect. Method 900 starts, at 902, when a location of a control region in a carrier for receiving grant information is determined. The determination can be that grant information is in a non-legacy control region. Alternatively, the determination can be that grant information is in a legacy control region per carrier.

At 904, grant information is received. In accordance with some aspects, receiving can include receiving multicarrier grant information as one grant per carrier on downlink carrier that carries multicarrier grant.

Grant information is selectively decoded, at 906. Decoding can include identifying independent assignments with cross-carrier operation. In accordance with some aspects, decoding can include evaluating grant information and at least one field related to a cyclic redundancy check, a Hybrid Automatic Repeat Request process Identification, a flag, or combinations thereof and utilizing the common field with the multicarrier wireless communications systems.

In accordance with some aspects, a computer program product can include a computer-readable medium that comprises codes for carrying out various aspects of method 9. Computer-readable medium can include a first set of codes for causing a computer to determine a location of a control region in a carrier for receiving grant information. Computer-readable medium can also include a second set of codes for causing computer to receive grant information and a third set of codes for causing computer to decode grant information.

Figure 10:
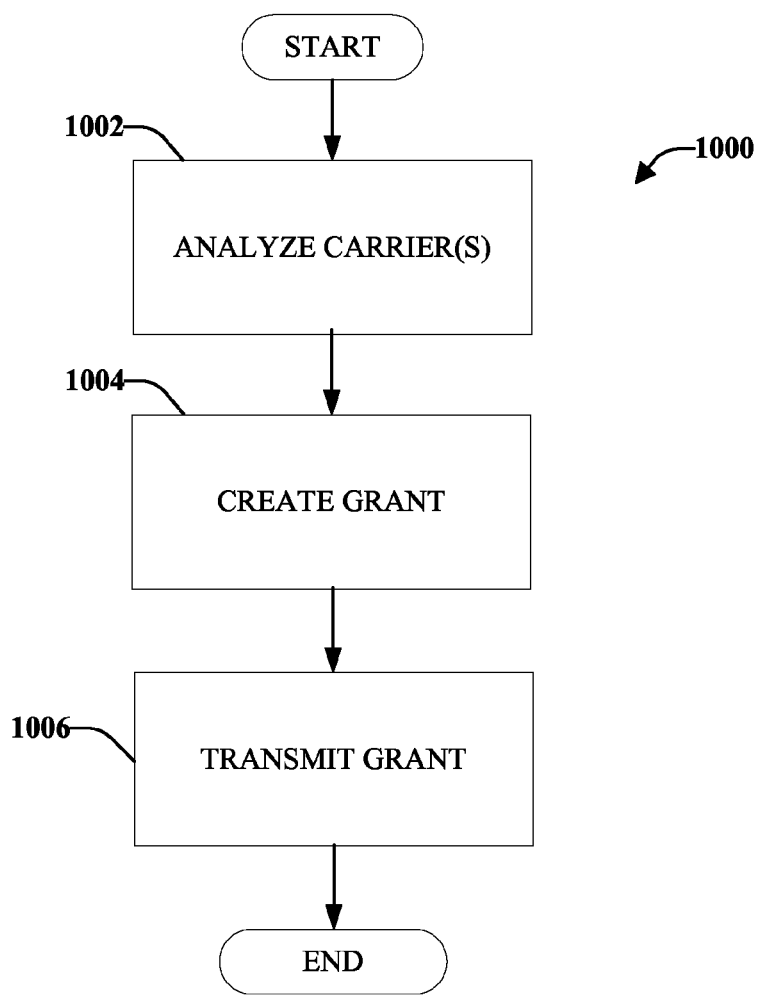
FIG. 10 illustrates a method for utilizing a grant across multicarrier systems, according to an aspect.

FIG. 10 illustrates a method 1000 for utilizing a grant across multicarrier systems, according to an aspect. A HARQ process ID can be common across carriers (e.g., number of bits remains the same regardless of the number of carriers in a multicarrier system). If a separate grant is sent per carrier, then a separate HARQ process ID must be communicated per carrier, which can increase overhead. To mitigate this overhead, method 1000 utilizes a jointly encoded grant that conveys assignment for multiple carriers and, therefore, can have a common HARQ process ID across all carriers, which can mitigate overhead. At 1002, at least one carrier with a multicarrier wireless communication system is analyzed. Based on the analysis, at 1004, a grant is created. The created grant can include a CRC, a HARQ process ID a flag, or combinations thereof. In accordance with some aspects, grant can be formatted and created so that grant can be utilized across two or more carrier systems. Grant can be a multicarrier grant with a common HARQ process ID that can be used across all carriers. A new data indicator (NDI) can be used in conjunction with HARQ process ID information. For MIMO case, there can be a NDI per code word per carrier. For SIMO case, there can be a NDI per carrier. Grant is transmitted, at 1006.

Figure 11:
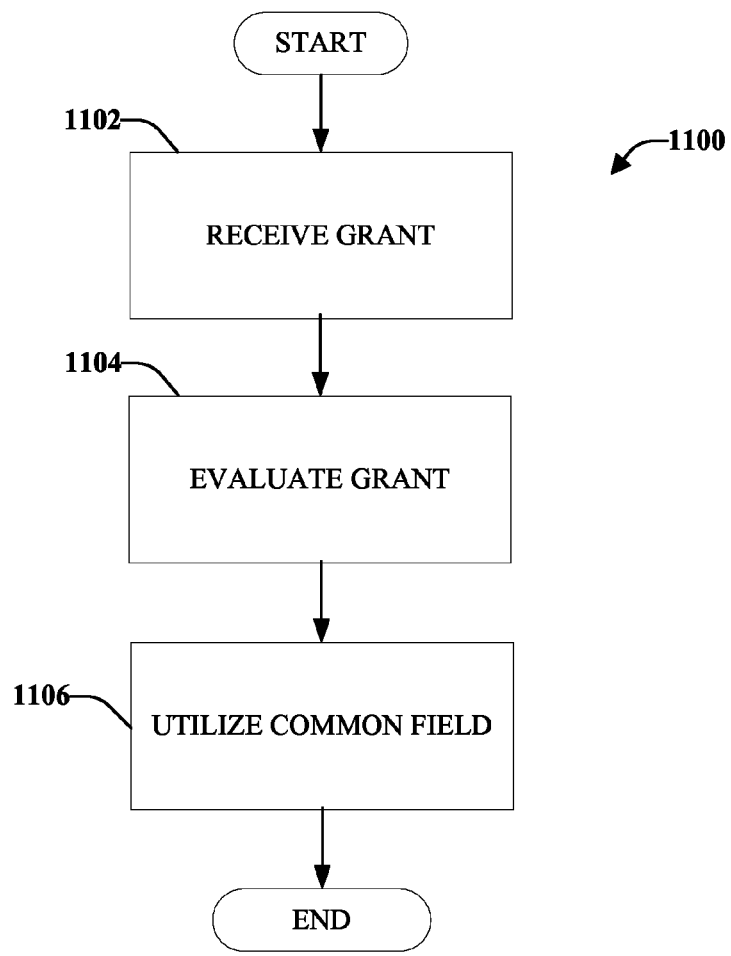
FIG. 11 illustrates a method for utilizing a received grant in a multicarrier system, according to an aspect.

FIG. 11 illustrates a method 1100 for utilizing a received grant in a multicarrier system, according to an aspect. Method 1100 is configured to utilize a jointly encoded grant that conveys assignment information for multiple carriers. Further, method 1100 can provide full flexibility in terms of assigning data on some or all carriers at a certain TTI, with or without code word blanking (for MIMO). Alternatively or additionally, method 1100 can mitigate overhead with respect to separate HARQ process ID per carrier (e.g., three bits versus N*3 bits, where N is number of carriers).

At 1102, a grant is received. Grant can be received from a base station that employed method 1000 of FIG. 10. For example, grant can be a multicarrier grant with a common HARQ process ID that can be used across all carriers. A new data indicator (NDI) can be used in conjunction with HARQ process ID information. For MIMO case, there can be a NDI per code word per carrier. For SIMO case, there can be a NDI per carrier. At 1104, grant and one or more common fields related to a CRC, a HARQ process ID, and/or a flag is evaluated. Common field(s) are utilized, at 1106, in a multicarrier system. The disclosed aspects can apply to MIMO and/or SIMO.

Figure 12:
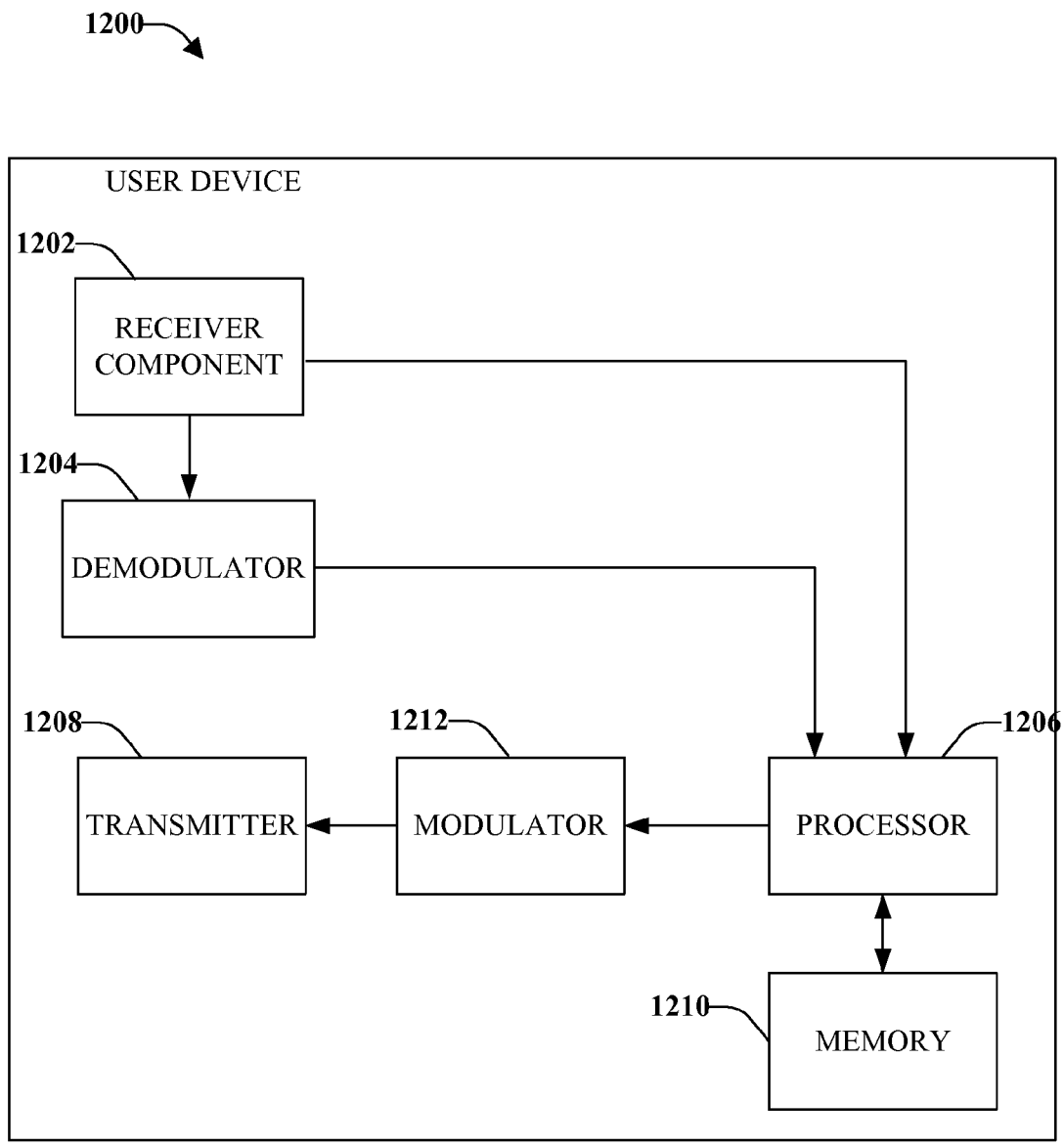
FIG. 12 illustrates a system that facilitates communication of grants in a multicarrier wireless communications system in accordance with one or more of the disclosed aspects.

With reference now to FIG. 12, illustrated is a system 1200 that facilitates communication of grants in a multicarrier wireless communications system in accordance with one or more of the disclosed aspects. System 1200 can reside in a user device. System 1200 comprises a receiver component 1202 that can receive a signal from, for example, a receiver antenna. Receiver component 1202 can perform typical actions thereon, such as filtering, amplifying, downconverting, etc. the received signal. Receiver component 1202 can also digitize the conditioned signal to obtain samples. A demodulator 1204 can obtain received symbols for each symbol period, as well as provide received symbols to a processor 1206.

Processor 1206 can be a processor dedicated to analyzing information received by receiver component 1202 and/or generating information for transmission by a transmitter 1208. In addition or alternatively, processor 1206 can control one or more components of system 1200, analyze information received by receiver component 1202, generate information for transmission by transmitter 1208, and/or control one or more components of system 1200. Processor 1206 may include a controller component capable of coordinating communications with additional user devices.

System 1200 can additionally comprise memory 1210 operatively coupled to processor 1206. Memory 1210 can store information related to coordinating communications and any other suitable information. Memory 1210 can additionally store protocols associated with communication of grants. It will be appreciated that data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 1210 of the various aspects is intended to comprise, without being limited to, these and any other suitable types of memory. System 1200 can further comprise a symbol modulator 1212, wherein transmitter 1208 transmits the modulated signal.

Figure 13:
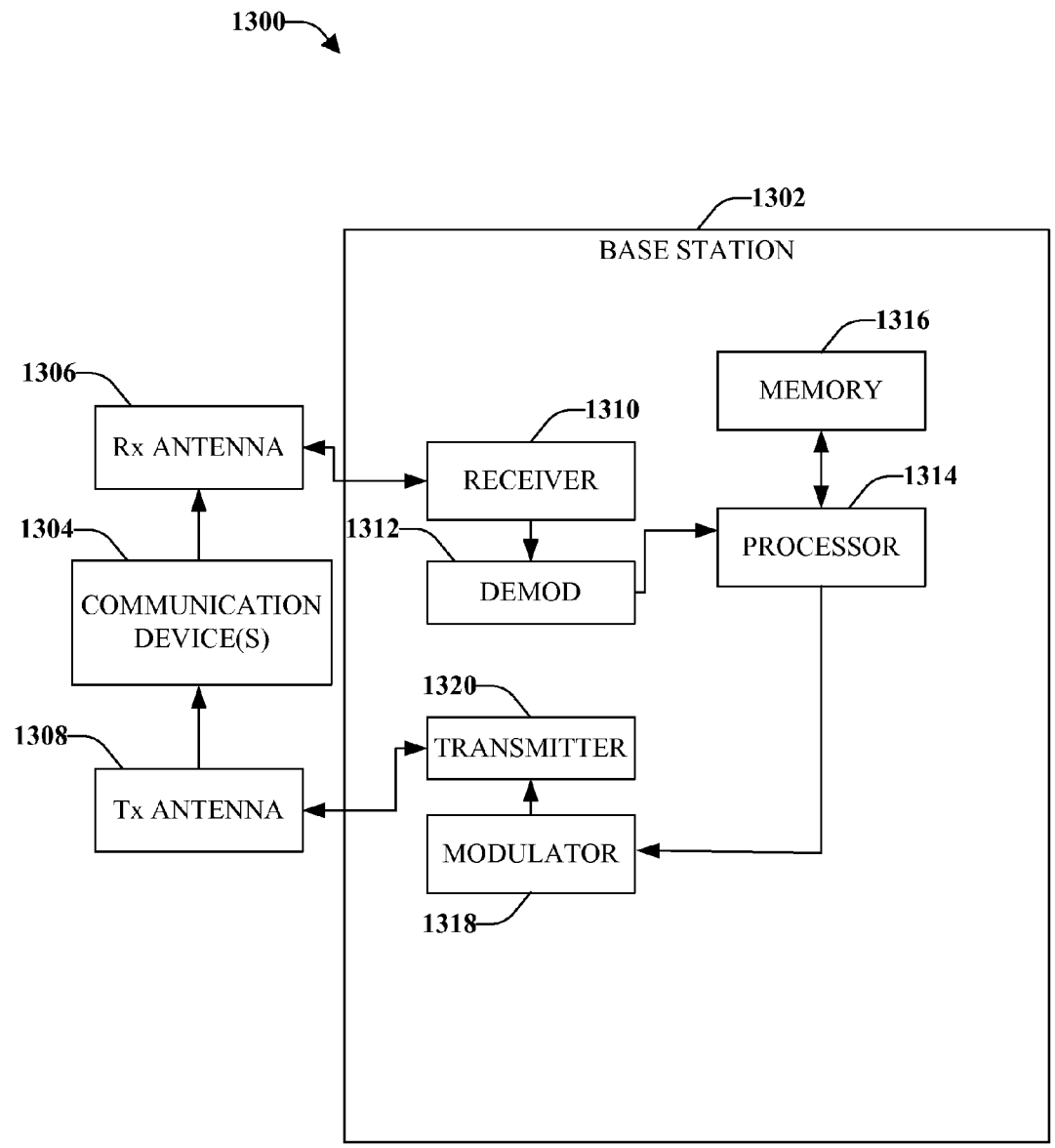
FIG. 13 illustrates a system that facilitates communication of grants in accordance with various aspects presented herein.

FIG. 13 is an illustration of a system 1300 that facilitates communication of grants in accordance with various aspects presented herein. System 1300 comprises a base station or access point 1302. As illustrated, base station 1302 receives signal(s) from one or more communication devices 1304 (e.g., user device) by a receive antenna 1306, and transmits to the one or more communication devices 1304 through a transmit antenna 1308.

Base station 1302 comprises a receiver 1310 that receives information from receive antenna 1306 and is operatively associated with a demodulator 1312 that demodulates received information. Demodulated symbols are analyzed by a processor 1314 that is coupled to a memory 1316 that stores information related to conveying grants in a multicarrier wireless communications system. A modulator 1318 can multiplex the signal for transmission by a transmitter 1320 through transmit antenna 1308 to communication devices 1304.

Figure 14:
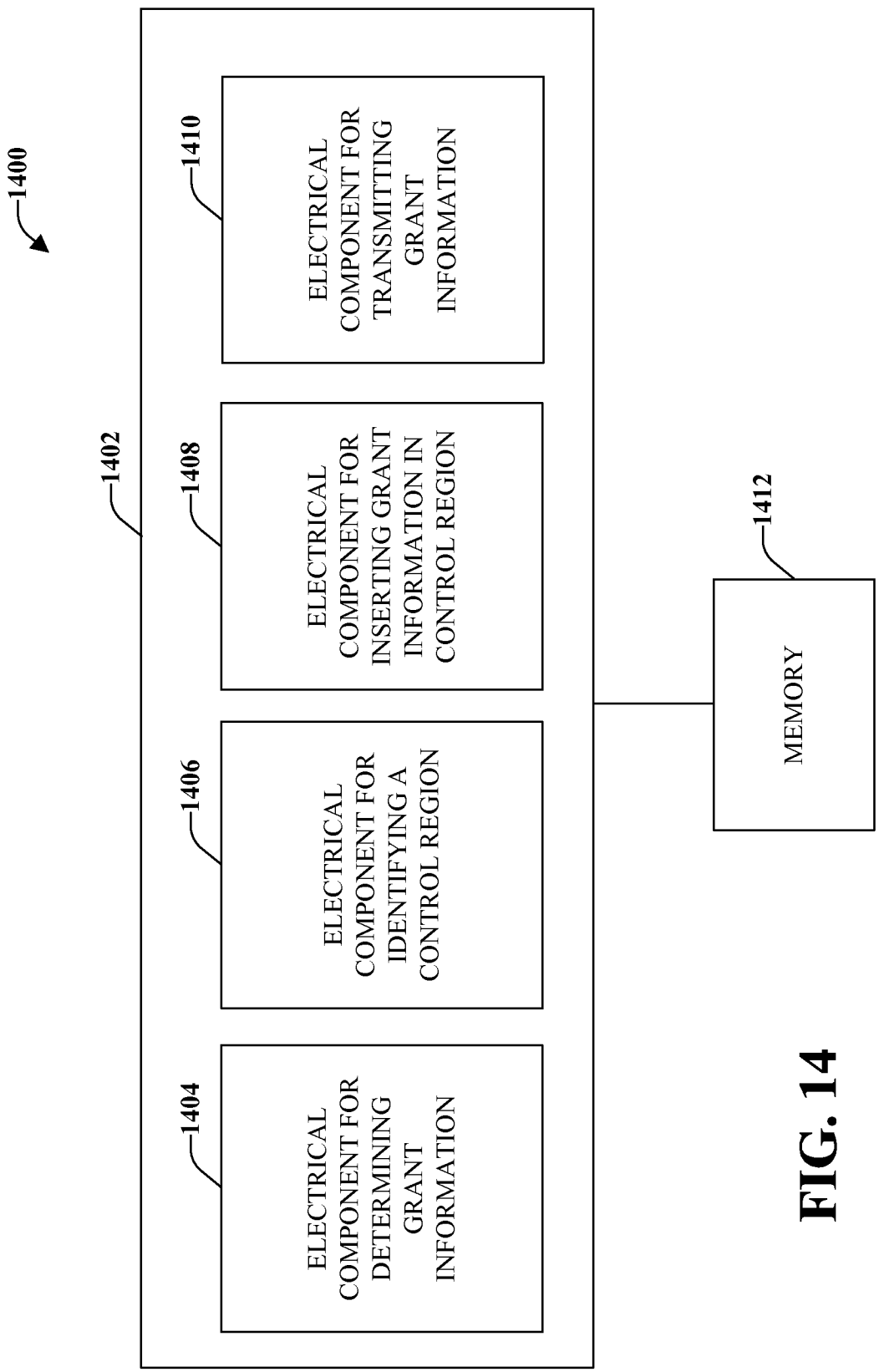
FIG. 14 illustrates an example system that transmits grants in a multicarrier wireless communications environment.

With reference to FIG. 14, illustrated is an example system 1400 that transmits grants in a multicarrier wireless communications environment. System 1400 can reside at least partially within a base station. It is to be appreciated that system 1400 is represented as including functional blocks, which may be functional blocks that represent functions implemented by a processor, software, or combination thereof (e.g., firmware).

System 1400 includes a logical grouping 1402 of electrical components that can act separately or in conjunction. Logical grouping 1402 includes an electrical component 1404 for determining grant information. According to some aspects, electrical component 1404 defines multicarrier Digital Carrier Interface information for a plurality of bandwidth cases, wherein each bandwidth case corresponds to a number of carriers. Further, electrical component 1404 includes, in grant information, scheduled carrier information.

In accordance with some aspects, electrical component 1404 includes common fields regardless of a number of assigned carriers and a number of carriers in multicarrier wireless communications environment and inserts additional bits that point to a location of a carrier specific Digital Carrier Interface. In accordance with another aspect, electrical component 1404 semi-statically configures a mobile device to be associated with a subset of carriers in multicarrier wireless communications environment and provides a bitmap of the subset of carriers.

Logical grouping 1402 also includes an electrical component 1406 for identifying a control region to communicate grant information as a function of user device capabilities. In accordance with some aspects, electrical component 1404 evaluates at least one carrier system associated with multicarrier wireless communications environment and electrical component 1406 creates a grant with a common field for at least one of a cyclic redundancy check, a Hybrid Automatic Repeat Request process Identification, a flag, or combinations thereof.

Also included in logical grouping 1402 is an electrical component 1408 for inserting grant information in identified control region. Further, logical grouping 1402 includes an electrical component 1410 for conveying grant information in identified control region. Identified control region can be a legacy control region or a non-legacy control region. Electrical component 1410 can convey multicarrier grant information as one grant per carrier on a downlink carrier that carries a multicarrier grant. According to some aspects, electrical component 1410 conveys multicarrier grant information as one grant carrying assignment for at least a subset of carriers on a downlink carrier that carriers a multicarrier grant.

Additionally, system 1400 can include a memory 1412 that retains instructions for executing functions associated with electrical components 1404, 1406, 1408 and 1410 or other components. While shown as being external to memory 1412, it is to be understood that one or more of electrical components 1404, 1406, 1408, and 1410 may exist within memory 1412.

Figure 15:
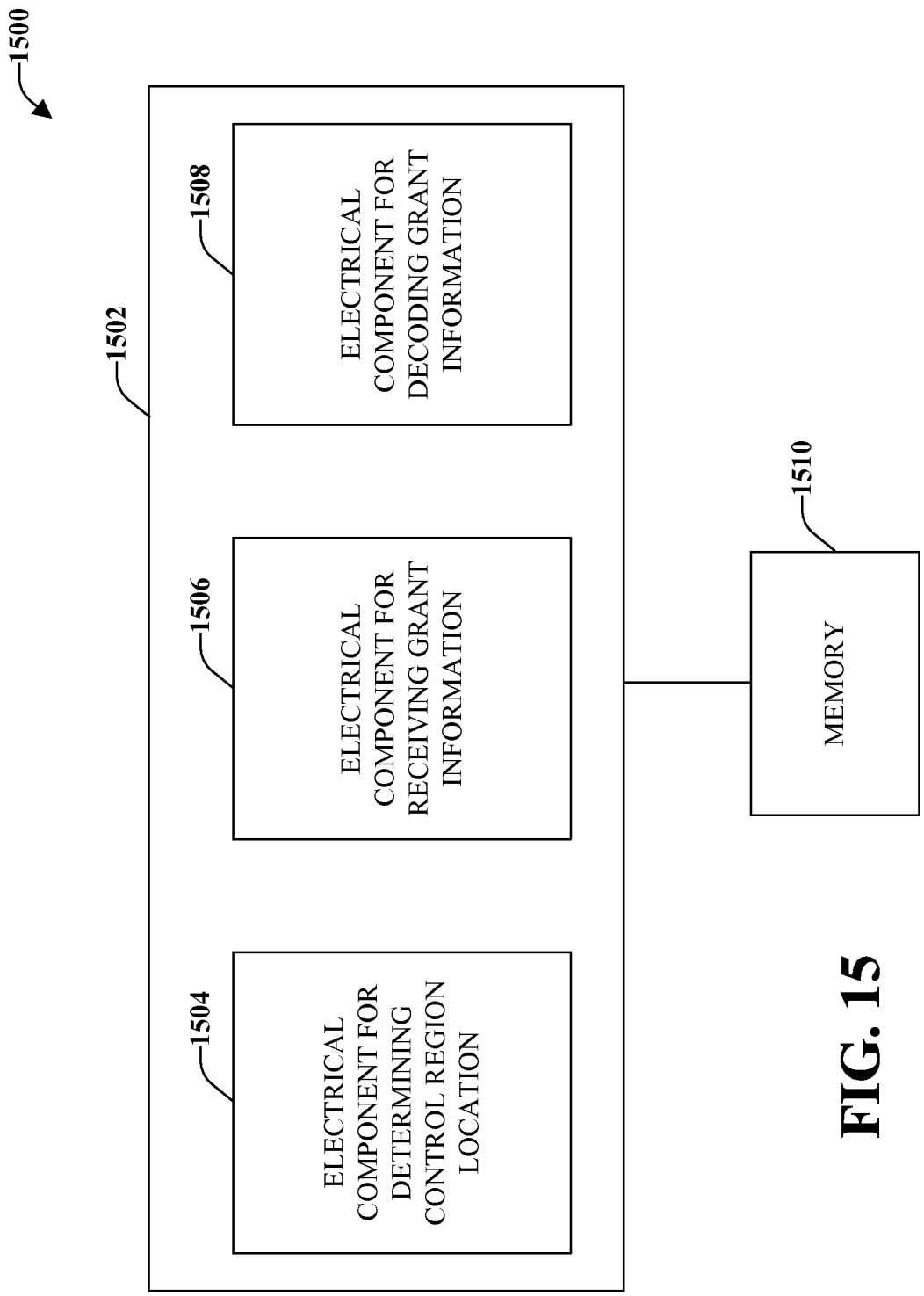
FIG. 15 illustrates an example system that receives grants in a multicarrier wireless communications environment.

FIG. 15 illustrates an example system 1500 that receives grants in a multicarrier wireless communications environment. System 1500 may reside at least partially within a mobile device. It is to be appreciated that system 1500 is represented as including functional blocks, which may be functional blocks that represent functions implemented by a processor, software, or combination thereof (e.g., firmware).

System 1500 includes a logical grouping 1502 of electrical components that can act separately or in conjunction. Logical grouping 1502 includes an electrical component 1504 for determining a location of a control region in one or more carriers for receiving grant information.

Logical grouping 1502 also includes an electrical component 1506 for receiving grant information. Electrical component 1506 can receive multicarrier grant information as one grant for each of the one or more carriers on a downlink carrier that carries a multicarrier grant.

Further, logical grouping 1502 includes an electrical component 1508 for selectively decoding grant information. Grant information can be in a non-legacy control region or a legacy control region per carrier. In accordance with some aspects, electrical component 1508 identifies independent assignments with cross-carrier operation. According to some aspects, electrical component 1508 evaluates grant information and at least one common field related to a cyclic redundancy check, a Hybrid Automatic Repeat Request process Identification, a flag, or combinations thereof. Further, electrical component 1508 utilizes the at least one common field within a multicarrier wireless communications system.

Additionally, system 1500 can include a memory 1510 that retains instructions for executing functions associated with electrical components 1504, 1506, and 1508 or other components. While shown as being external to memory 1510, it is to be understood that one or more of electrical components 1504, 1506, and 1508 may exist within memory 1510.

Figure 16:
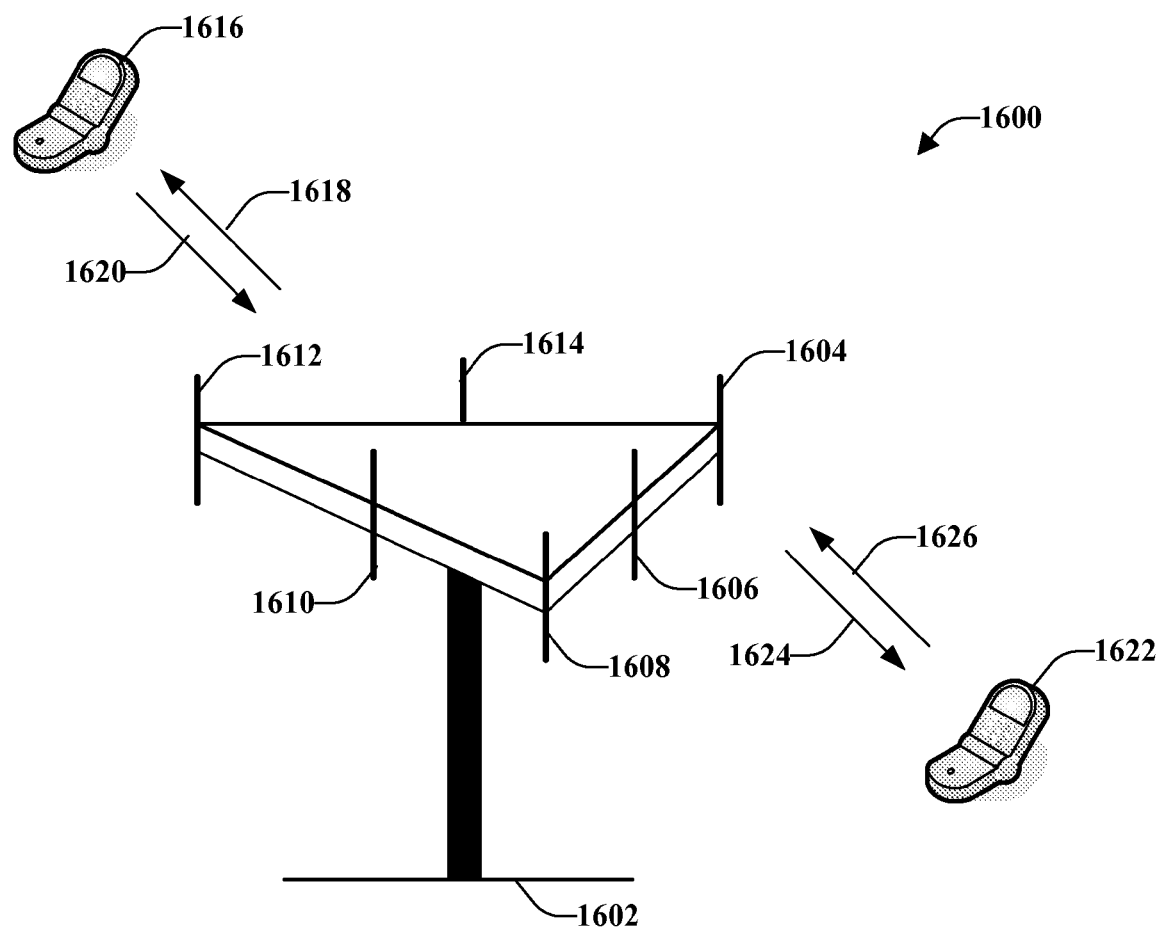
FIG. 16 illustrates a multiple access wireless communication system according to one or more aspects.

Referring now to FIG. 16, a multiple access wireless communication system 1600 according to one or more aspects is illustrated. A wireless communication system 1600 can include one or more base stations in contact with one or more user devices. Each base station provides coverage for a plurality of sectors. A three-sector base station 1602 is illustrated that includes multiple antenna groups, one including antennas 1604 and 1606, another including antennas 1608 and 1610, and a third including antennas 1612 and 1614. According to the figure, only two antennas are shown for each antenna group, however, more or fewer antennas may be utilized for each antenna group. Mobile device 1616 is in communication with antennas 1612 and 1614, where antennas 1612 and 1614 transmit information to mobile device 1616 over forward link 1618 and receive information from mobile device 1616 over reverse link 1620. Forward link (or downlink) refers to communication link from base stations to mobile devices, and reverse link (or uplink) refers to communication link from mobile devices to base stations. Mobile device 1622 is in communication with antennas 1604 and 1606, where antennas 1604 and 1606 transmit information to mobile device 1622 over forward link 1624 and receive information from mobile device 1622 over reverse link 1626. In a FDD system, for example, communication links 1618, 1620, 1624, and 1626 might utilize different frequencies for communication. For example, forward link 1618 might use a different frequency than the frequency utilized by reverse link 1620.

Each group of antennas and/or the area in which they are designated to communicate may be referred to as a sector of base station 1602. In one or more aspects, antenna groups each are designed to communicate to mobile devices in a sector or the areas covered by base station 1602. A base station may be a fixed station used for communicating with mobile devices.

In communication over forward links 1618 and 1624, transmitting antennas of base station 1602 can utilize beamforming in order to improve a signal-to-noise ratio of forward links for different mobile devices 1616 and 1622. Also, a base station utilizing beamforming to transmit to mobile devices scattered randomly through its coverage area might cause less interference to mobile devices in neighboring cells than the interference that can be caused by a base station transmitting through a single antenna to all mobile devices in its coverage area.

Figure 17:
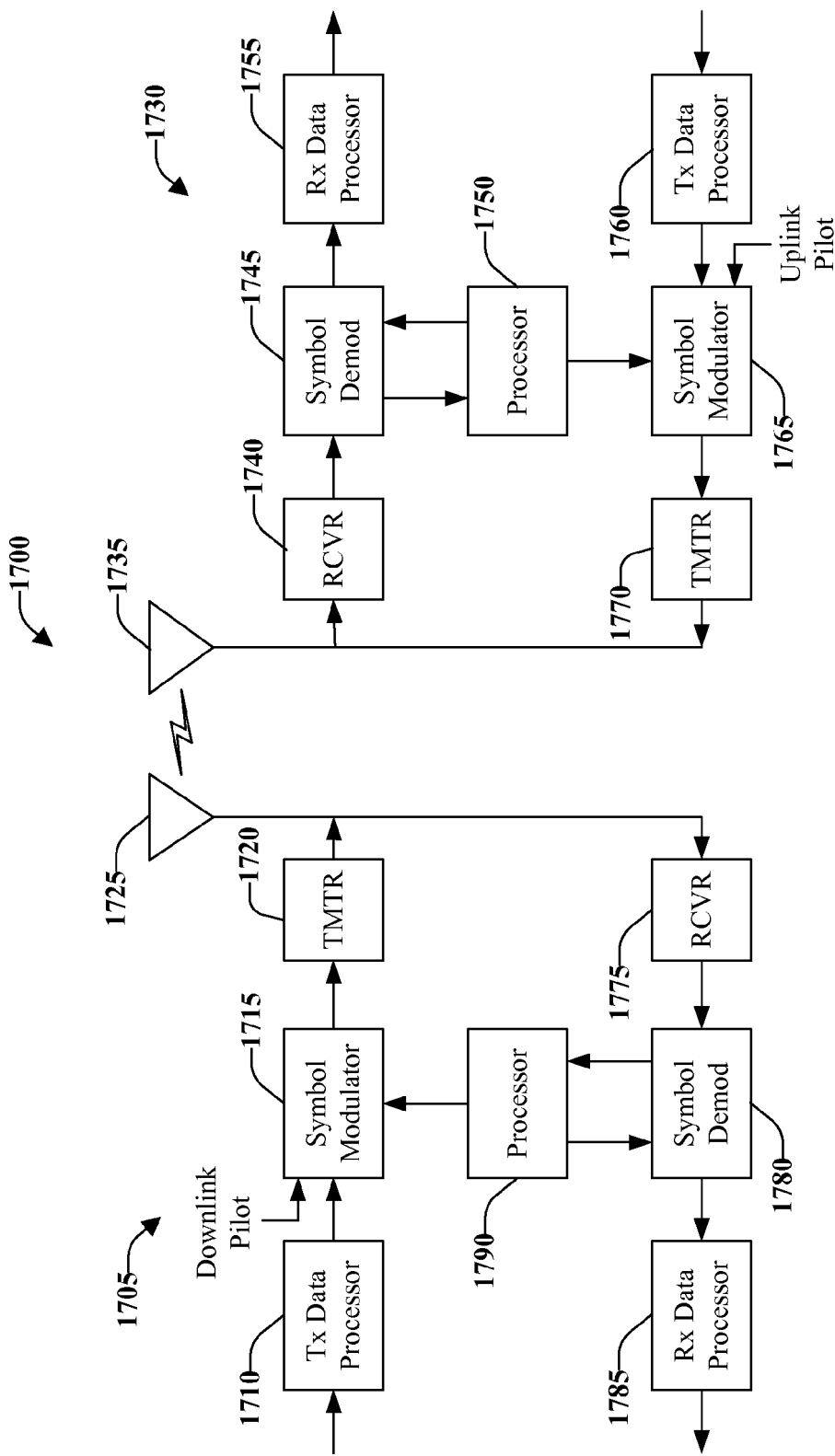
FIG. 17 illustrates an exemplary wireless communication system, according to various aspects.

FIG. 17 illustrates an exemplary wireless communication system 1700, according to various aspects. Wireless communication system 1700 depicts one base station and one terminal for sake of brevity. However, it is to be appreciated that wireless communication system 1700 can include more than one base station or access point and/or more than one terminal or user device, wherein additional base stations and/or terminals can be substantially similar or different from the exemplary base station and terminal described below. In addition, it is to be appreciated that base station and/or terminal can employ various aspects described herein to facilitate wireless communication there between.

On a downlink, at access point 1702, a transmit (TX) data processor 1704 receives, formats, codes, interleaves, and modulates (or symbol maps) traffic data and provides modulation symbols ("data symbols"). A symbol modulator 1706 receives and processes data symbols and pilot symbols and provides a stream of symbols. Symbol modulator 1706 multiplexes data and pilot symbols and obtains a set of N transmit symbols. Each transmit symbol may be a data symbol, a pilot symbol, or a signal value of zero. Pilot symbols may be sent continuously in each symbol period. Pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1708 receives and converts the stream of symbols into one or more analog signals and further conditions (e.g., amplifies, filters, frequency upconverts, and so on) analog signals to generate a downlink signal suitable for transmission over wireless channel. Downlink signal is then transmitted through an antenna 1710 to terminals. At terminal 1712, an antenna 1714 receives downlink signal and provides a received signal to a receiver unit (RCVR) 1716. Receiver unit 1716 conditions (e.g., filters, amplifies, frequency downconverts, and so forth) received signal and digitizes conditioned signal to obtain samples. A symbol demodulator 1718 obtains N received symbols and provides received pilot symbols to a processor 1720 for channel estimation. Symbol demodulator 1718 further receives a frequency response estimate for the downlink from processor 1720, performs data demodulation on received data symbols to obtain data symbol estimates (which are estimates of transmitted data symbols). Further, symbol demodulator 1718 provides data symbol estimates to a RX data processor 1722, which demodulates (e.g., symbol demaps), deinterleaves, and decodes data symbol estimates to recover transmitted traffic data. Processing by symbol demodulator 1718 and RX data processor 1722 is complementary to processing by symbol modulator 1706 and TX data processor 1704, respectively, at access point 1702.

On the uplink, a TX data processor 1724 processes traffic data and provides data symbols. A symbol modulator 1726 receives and multiplexes data symbols with pilot symbols, performs modulation, and provides a stream of symbols. A transmitter unit 1728 receives and processes the stream of symbols to generate an uplink signal, which is transmitted by antenna 1714 to access point 1702.

At access point 1702, uplink signal from terminal 1712 is received by antenna 1710 and processed by a receiver unit 1730 to obtain samples. A symbol demodulator 1732 then processes the samples and provides received pilot symbols and data symbol estimates for uplink. A RX data processor 1734 processes data symbol estimates to recover traffic data transmitted by terminal 1712. A processor 1736 performs channel estimation for each active terminal transmitting on uplink.

Processors 1736 and 1720 direct (e.g., control, coordinate, manage, and so forth) operation at access point 1702 and terminal 1712, respectively. Respective processors 1736 and 1720 can be associated with memory units (not shown) that store program codes and data. Processors 1736 and 1720 can also perform computations to derive frequency and impulse response estimates for uplink and downlink, respectively.

For a multiple-access system (e.g., FDMA, OFDMA, CDMA, TDMA, and the like), multiple terminals can transmit concurrently on uplink. For such a system, pilot subbands may be shared among different terminals. Channel estimation techniques may be used in cases where pilot subbands for each terminal span the entire operating band (possibly except for band edges). Such a pilot subband structure would be desirable to obtain frequency diversity for each terminal. The techniques described herein may be implemented by various means. For example, these techniques may be implemented in hardware, software, or a combination thereof. For a hardware implementation, processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform functions described herein, or a combination thereof. With software, implementation can be through modules (e.g., procedures, functions, and so on) that perform functions described herein. Software codes may be stored in memory unit and executed by processors 1736 and 1720.

It is to be understood that aspects described herein may be implemented by hardware, software, firmware or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, techniques described herein may be implemented with modules (e.g., procedures, functions, and so on) that perform functions described herein. Software codes may be stored in memory units and executed by processors. Memory unit may be implemented within processor or external to processor, in which case it can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g. compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the steps and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, the ASIC may reside in a user terminal. In the alternative, processor and storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of described aspects and/or aspects as defined by the appended claims. Accordingly, described aspects are intended to embrace all such alterations, modifications and variations that fall within scope of appended claims. Furthermore, although elements of described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method for transmitting grants in a multicarrier wireless communications environment, comprising:
   determining, by a base station, a grant information to a user device, wherein the grant information assigns resources for a carrier in a first frequency range;
   selecting, by the base station, a control region on a carrier in a second frequency range in which to insert the grant information as a function of user device capabilities;
   inserting the grant information in the selected control region; and
   transmitting the grant information in the selected control region to the user device, wherein the control region is a legacy control region or a non-legacy control region, wherein the legacy control region is located on control resources monitored by mobile devices configured for single carrier systems, and wherein the non-legacy control region excludes the control resources monitored by mobile devices configured for single carrier systems.

2. The method of claim 1, wherein inserting the grant information in the control region comprises applying independent assignments with cross-carrier operation.

3. The method of claim 1, wherein inserting the grant information in the control region comprises:
   concatenating a multicarrier grant information; and
   inserting the multicarrier grant information in an identified control region.

4. The method of claim 1, wherein inserting the grant information in the control region comprises:
   segmenting the grant information over a control region associated with multiple carriers; and
   concatenating control segments to form a multicarrier assignment.

5. The method of claim 1, wherein transmitting the grant information in the selected control region comprises:
   sending multicarrier grant information as one grant per carrier on a downlink carrier.

6. The method of claim 1, wherein transmitting the grant information in the selected control region comprises:

sending multicarrier grant information as one grant carrying assignment for at least a subset of carriers on a downlink carrier that carriers a multicarrier grant.

7. The method of claim 1, wherein the determining the grant information comprises analyzing at least one carrier system associated with the multicarrier wireless communications environment, wherein inserting the grant information in the control region comprises creating a grant with a common field for at least one of a cyclic redundancy check, a Hybrid Automatic Repeat Request process Identification, a flag, or combinations thereof.

8. The method of claim 1, wherein the determining the grant information further comprises defining multicarrier Digital Carrier Interface information for a plurality of bandwidth cases, wherein each bandwidth case corresponds to a number of carriers.

9. The method of claim 8, further comprises including, in the grant information, a scheduled carrier information.

10. The method of claim 1, wherein the determining the grant information further comprises including common fields regardless of a number of assigned carriers and a number of carriers in the multicarrier wireless communications environment.

11. The method of claim 10, further comprises adding additional bits that point to a location of a carrier specific Digital Carrier Interface.

12. The method of claim 1, wherein the determining the grant information further comprises:
   configuring the user device to be associated with a subset of carriers in the multicarrier wireless communications environment; and
   providing a bitmap of the subset of carriers.

13. A wireless communications apparatus, comprising:
   a memory that retains instructions related to determining, by a base station, a grant information to a mobile device, wherein the grant information assigns resources for a carrier in a first frequency range, selecting, by the base station, a control region on a carrier in a second frequency range in which to insert the grant information as a function of mobile device capabilities, inserting the grant information in the selected control region, and transmitting the grant information in the selected control region to the mobile device, wherein the control region is a legacy control region or a non-legacy control region, wherein the legacy control region is located on control resources monitored by mobile devices configured for single carrier systems, and wherein the non-legacy control region excludes the control resources monitored by mobile devices configured for single carrier systems; and
   a processor, coupled to the memory, configured to execute the instructions retained in the memory.

14. The wireless communications apparatus of claim 13, wherein the instructions related to inserting the grant information in the control region further applies independent assignments with cross-carrier operation.

15. The wireless communications apparatus of claim 13, wherein the instructions related to transmitting the grant information in the selected control region further conveys multicarrier grant information as one grant per carrier on a downlink carrier.

16. The wireless communications apparatus of claim 13, wherein the instructions related to transmitting the grant information in the selected control region further convey multicarrier grant information as one grant carrying assignment for at least a subset of carriers on a downlink carrier that carriers a multicarrier grant.

17. The wireless communications apparatus of claim 13, wherein the instructions related to determining the grant information further analyzes at least one carrier system associated with a multicarrier wireless communications system, wherein the instructions related to inserting the grant information in the control region further creates a grant with a common field for at least one of a cyclic redundancy check, a Hybrid Automatic Repeat Request process Identification, a flag, or combinations thereof.

18. The wireless communications apparatus of claim 13, wherein the instructions related to determining the grant information further defines multicarrier Digital Carrier Interface information for a plurality of bandwidth cases and includes, in the grant information, a scheduled carrier information, wherein each bandwidth case corresponds to a number of carriers.

19. The wireless communications apparatus of claim 13, wherein the instructions related to determining the grant information further includes common fields regardless of a number of assigned carriers and a number of carriers in a multicarrier wireless communications system and adds additional bits that point to a location of a carrier specific Digital Carrier Interface.

20. The wireless communications apparatus of claim 13, wherein the instructions related to determining the grant information configures the mobile device to be associated with a subset of carriers in a multicarrier wireless communications system and provides a bitmap of the subset of carriers.

21. A wireless communications apparatus that transmits grants in a multicarrier wireless communications system, comprising:
    means for determining, by a base station, a grant information to a user device, wherein the grant information assigns resources for a carrier in a first frequency range;
    means for selecting, by the base station, a control region on a carrier in a second frequency range in which to insert the grant information as a function of user device capabilities;
    means for inserting the grant information in the selected control region; and
    means for conveying the grant information in the selected control region to the user device, wherein the control region is a legacy control region or a non-legacy control region, wherein the non-legacy control region excludes a frequency range monitored by mobile devices configured for single carrier systems, and the legacy control region lies entirely within a frequency range monitored by mobile devices configured for single carrier systems.

22. The wireless communications apparatus of claim 21, wherein the means for conveying the grant information in the selected control region conveys multicarrier grant information as one grant per carrier on a downlink carrier.

23. The wireless communications apparatus of claim 21, wherein the means for conveying the grant information in the selected control region conveys multicarrier grant information as one grant carrying assignment for at least a subset of carriers on a downlink carrier that carriers a multicarrier grant.

24. The wireless communications apparatus of claim 21, wherein the means for determining a grant information evaluates at least one carrier system associated with the multicarrier wireless communications system, wherein the means for inserting the grant information in the control region further creates a grant with a common field for at least one of a cyclic redundancy check, a Hybrid Automatic Repeat Request process Identification, a flag, or combinations thereof.

25. The wireless communications apparatus of claim 21, wherein the means for determining the grant information defines multicarrier Digital Carrier Interface information for a plurality of bandwidth cases, wherein each bandwidth case corresponds to a number of carriers and includes, in the grant information, a scheduled carrier information.

26. The wireless communications apparatus of claim 21, wherein the means for determining the grant information includes common fields regardless of a number of assigned carriers and a number of carriers in the multicarrier wireless communications system and inserts additional bits that point to a location of a carrier specific Digital Carrier Interface.

27. The wireless communications apparatus of claim 21, wherein the means for determining a grant information configures the mobile device to be associated with a subset of carriers in the multicarrier wireless communications system and provides a bitmap of the subset of carriers.

28. A non-transitory computer-readable medium comprising:
    a first set of codes for causing a computer to determine, by a base station, a grant information to a user device, wherein the grant information assigns resources for a carrier in a first frequency range;
    a second set of codes for causing the computer to select, by the base station, a control region on a carrier in a second frequency range in which to insert the grant information as a function of user device capabilities, wherein the control region is a legacy control region or a non-legacy control region, wherein the legacy control region is located on control resources monitored by mobile devices configured for single carrier systems, and wherein the non-legacy control region excludes the control resources monitored by mobile devices configured for single carrier systems;
    a third set of codes for causing the computer to insert the grant information in the selected control region; and
    a fourth set of codes for causing the computer to communicate the grant information to the user device in the selected control region.

29. At least one processor configured to transmit grants in a multicarrier wireless communications system, comprising:
    a first module for determining, by a base station, a grant information to a user device, wherein the grant information assigns resources for a carrier in a first frequency range;
    a second module for selecting, by the base station, a control region on a carrier in a second frequency range in which to insert the grant information as a function of user device capabilities;
    a third module for inserting the grant information in the selected control region; and
    a fourth module for transmitting the grant information to the user device in the selected control region, wherein the control region is a non-legacy control region or a legacy control region per carrier, wherein the non-legacy control region excludes a frequency range monitored by mobile devices configured for single carrier systems, and the legacy control region lies entirely within a frequency range monitored by mobile devices configured for single carrier systems.

30. A method for receiving grants in a multicarrier wireless communications environment, comprising:
    determining, at a user device, a location of a control region on a carrier in a first frequency range from a plurality of possible locations for the control region in one or more carriers for receiving grant information from a base station, wherein the grant information assigns resources for a carrier in a second frequency range, wherein the control region is a legacy control region or a non-legacy control region, wherein the legacy control region is located on control resources monitored by mobile devices configured for single carrier systems, and wherein the non-legacy control region excludes the control resources monitored by mobile devices configured for single carrier systems;

receiving, at the user device, the grant information from the base station at the location selected, by the base station, for insertion of the grant information as a function of capabilities of the user device; and selectively decoding, at the user device, the grant information.

31. The method of claim 30, wherein selectively decoding the grant information comprises identifying independent assignments with cross-carrier operation.

32. The method of claim 30, wherein receiving the grant information comprises receiving multicarrier grant information as one grant per carrier on a downlink carrier that carries a multicarrier grant.

33. The method of claim 30, wherein selectively decoding the grant information comprising:
evaluating the grant information and at least one common field related to a cyclic redundancy check, a Hybrid Automatic Repeat Request process Identification, a flag, or combinations thereof; and
utilizing the at least one common field within the multicarrier wireless communications environment.

34. A wireless communications apparatus, comprising:
a memory that retains instructions related to evaluating a location of a control region on a carrier in a first frequency range from a plurality of possible locations for the control region in one or more carriers for receiving grant information from a base station, wherein the grant information assigns resources for a carrier in a second frequency range, receiving the grant information from the base station at the location selected, by the base station, for insertion of the grant information as a function of capabilities of the wireless communications apparatus, and selectively decoding, at the wireless communications apparatus, the grant information, wherein the control region is a legacy control region or a non-legacy control region, wherein the legacy control region is located on control resources monitored by mobile devices configured for single carrier systems, and wherein the non-legacy control region excludes the control resources monitored by mobile devices configured for single carrier systems; and
a processor, coupled to the memory, configured to execute the instructions retained in the memory.

35. The wireless communications apparatus of claim 34, wherein the instructions related to selectively decoding the grant information further identifies independent assignments with cross-carrier operation.

36. The wireless communications apparatus of claim 34, wherein the instructions related to receiving the grant information further receives multicarrier grant information as one grant for each of the one or more carriers on a downlink carrier that carries a multicarrier grant.

37. The wireless communications apparatus of claim 34, wherein the instructions related to selectively decoding the grant information evaluates the grant information and at least one common field related to a cyclic redundancy check, a Hybrid Automatic Repeat Request process Identification, a flag, or combinations thereof and utilizes the at least one common field with a multicarrier wireless communications systems.

38. A wireless communications apparatus that receives grants in a multicarrier wireless communications system, comprising:
means for determining a location of a control region on a carrier in a first frequency range from a plurality of possible locations for the control region in one or more carriers for receiving grant information from a base station, wherein the grant information assigns resources for a carrier in a second frequency range;
means for receiving the grant information from the base station at the location selected, by the base station, for insertion of the grant information as a function of capabilities of-the wireless communications apparatus; and
means for selectively decoding, at the wireless communications apparatus, the grant information, wherein, the grant information is in a non-legacy control region or a legacy control region per carrier, the non-legacy control region excludes a frequency range monitored by mobile devices configured for single carrier systems, and the legacy control region lies entirely within a frequency range monitored by mobile devices configured for single carrier systems.

39. The wireless communications apparatus of claim 38, wherein the means for selectively decoding the grant information identifies independent assignments with cross-carrier operation.

40. The wireless communications apparatus of claim 38, wherein the means for receiving the grant information receives multicarrier grant information as one grant for each of the one or more carriers on a downlink carrier that carries a multicarrier grant.

41. The wireless communications apparatus of claim 38, wherein the means for selectively decoding the grant information evaluates the grant information and at least one common field related to a cyclic redundancy check, a Hybrid Automatic Repeat Request process Identification, a flag, or combinations thereof and utilizes the at least one common field within the multicarrier wireless communications system.

42. A non-transitory computer-readable medium comprising:
a first set of codes for causing a computer to determine a location of a control region on a carrier in a first frequency range from a plurality of possible locations for the control region in a carrier for receiving grant information at a user device from a base station, wherein the grant information assigns resources for a carrier in a second frequency range, wherein the control region is a legacy control region or a non-legacy control region, wherein the legacy control region is located on control resources monitored by mobile devices configured for single carrier systems, and wherein the non-legacy control region excludes the control resources monitored by mobile devices configured for single carrier systems;
a second set of codes for causing the computer to receive the grant information from the base station at the location selected, by the base station, for insertion of the grant information as a function of capabilities of the user device; and
a third set of codes for causing the computer to decode the grant information from the base station.

43. At least one processor configured to receive grants in a multicarrier wireless communications system, comprising:
a first module for determining a location of a control region on a carrier in a first frequency range from a plurality of possible locations for the control region in a carrier for receiving grant information at a user device from a base station, wherein the grant information assigns resources for a carrier in a second frequency range, wherein the control region is a legacy control region or a non-legacy control region, wherein the legacy control region is located on control resources monitored by mobile devices configured for single carrier systems, and wherein the non-legacy control region excludes the control resources monitored by mobile devices configured for single carrier systems;

a second module for receiving the grant information from the base station at the location selected, by the base station, for insertion of the grant information as a function of capabilities of the user device; and a third module for selectively decoding the grant information from the base station.

* * * * *